US012812623B2

(12) United States Patent
Lee et al.

(10) Patent No.: US 12,812,623 B2
(45) Date of Patent: Nov. 24, 2026

(54) METHOD AND APPARATUS FOR TRANSMITTING AND RECEIVING SEMI PERSISTENT SCHEDULING PDSCH IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR); Jaehyung Kim, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 18/280,094

(22) PCT Filed: Apr. 28, 2023

(86) PCT No.: PCT/KR2023/005841
§ 371 (c)(1),
(2) Date: Sep. 1, 2023

(87) PCT Pub. No.: WO2023/211233
PCT Pub. Date: Nov. 2, 2023

(65) Prior Publication Data

US 2025/0024447 A1 Jan. 16, 2025

Related U.S. Application Data

(60) Provisional application No. 63/336,222, filed on Apr. 28, 2022.

(51) Int. Cl.

| | |
|---|---|
| ***H04W 72/11*** | (2023.01) |
| ***H04W 72/232*** | (2023.01) |
| ***H04W 76/28*** | (2018.01) |

(52) U.S. Cl.
CPC .......... *H04W 72/11* (2023.01); *H04W 72/232* (2023.01); *H04W 76/28* (2018.02)

(58) Field of Classification Search
CPC ........... H04W 72/232; H04W 72/0446; H04W 72/11; H04W 72/1284; H04W 76/28;
(Continued)

(56) References Cited

U.S. PATENT DOCUMENTS

2021/0168779 A1* 6/2021 Mondal ................ H04L 5/0053
2022/0061074 A1 2/2022 Babaei et al.
(Continued)

FOREIGN PATENT DOCUMENTS

WO 2021040681 3/2021
WO 2022032032 2/2022

OTHER PUBLICATIONS

PCT International Application No. PCT/KR2023/005841, International Search Report dated Jul. 28, 2023, 3 pages.
(Continued)

*Primary Examiner* — Wei Zhao
(74) *Attorney, Agent, or Firm* — LEE, HONG, DEGERMAN, KANG & WAIMEY

(57) ABSTRACT

A method and apparatus for transmitting and receiving a semi-persistent scheduling PDSCH in a wireless communication system is disclosed. A method according to an embodiment of the present disclosure may include receiving, from a base station, respective configuration information related to one or more semi-persistent scheduling (SPS) configurations; receiving, from the base station, respective downlink control information (DCI) for activating the one or more SPS configurations; and based on information on a specific interval provided from the base station, receiving, from the base station, the SPS PDSCH in an SPS PDSCH
(Continued)

resource for the one or more SPS configurations not included in the specific interval.

11 Claims, 11 Drawing Sheets

(58) Field of Classification Search
CPC ............. H04W 52/0212; H04W 72/23; H04W 72/044; H04W 72/128; H04W 52/021
See application file for complete search history.

(56) References Cited

U.S. PATENT DOCUMENTS

| | | | | |
|---|---|---|---|---|
| 2022/0094484 | A1 | 3/2022 | Babaei | |
| 2022/0159568 | A1* | 5/2022 | Kim | H04W 52/0212 |
| 2024/0381373 | A1* | 11/2024 | Bagheri | H04L 5/0055 |
| 2025/0081288 | A1* | 3/2025 | Moon | H04W 76/28 |

OTHER PUBLICATIONS

Moderator (Nokia), "[108-3-NR-CRs-02] Issue #3 SPS PDSCH activation and PUCCH resource selection for the 1st SPS PDSCH," 3GPP TSG-RAN WG1 #108-e, e-Meeting, R1-2202833, Mar. 2022, 22 pages.

* cited by examiner

METHOD AND APPARATUS FOR TRANSMITTING AND RECEIVING SEMI PERSISTENT SCHEDULING PDSCH IN WIRELESS COMMUNICATION SYSTEM

CROSS-REFERENCE TO RELATED APPLICATION(S)

This application is the National Stage filing under 35 U.S.C. 371 of International Application No. PCT/KR2023/005841, filed on Apr. 28, 2023, and claims the benefit of U.S. Provisional Application No. 63/336,222, filed on Apr. 28, 2022, the contents of which are all incorporated by reference herein in their entirety.

TECHNICAL FIELD

The present disclosure relates to a wireless communication system, and in more detail, relates to a method and an apparatus of transmitting and receiving semi-persistent scheduling (SPS) physical downlink shared channel (PDSCH) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting and receiving an SPS PDSCH for an SPS configuration.

A technical object of the present disclosure is to provide a method and an apparatus for transmitting and receiving an SPS PDSCH in consideration of a discontinuous reception (DRX) operation of a base station or UE.

The technical objects to be achieved by the present disclosure are not limited to the above-described technical objects, and other technical objects which are not described herein will be clearly understood by those skilled in the pertinent art from the following description.

A method formed by a user equipment (UE) in a wireless communication system according to an aspect of the present disclosure may include: receiving, from a base station, respective configuration information related to one or more semi-persistent scheduling (SPS) configurations; receiving, from the base station, respective downlink control information (DCI) for activating the one or more SPS configurations; and based on information on a specific interval provided from the base station, receiving, from the base station, the SPS PDSCH in an SPS PDSCH resource for the one or more SPS configurations not included in the specific interval. The UE may not receive the SPS PDSCH in an SPS PDSCH resource for the one or more SPS configurations included in the specific interval.

A method performed by a base station in a wireless communication system according to an additional aspect of the present disclosure may include: transmitting, to a user equipment (UE), respective configuration information related to one or more semi-persistent scheduling (SPS) configurations; transmitting, to the UE, respective downlink control information (DCI) for activating the one or more SPS configurations; and based on information on a specific interval provided to the UE, transmitting, to the UE, the SPS PDSCH in an SPS PDSCH resource for the one or more SPS configurations not included in the specific interval. The base station may not transmit the SPS PDSCH in an SPS PDSCH resource for the one or more SPS configurations included in the specific interval.

According to an embodiment of the present disclosure, unnecessary power waste can be reduced by determining whether to transmit or receive an SPS PDSCH according to a DRX operation of a UE or a base station.

In addition, according to an embodiment of the present disclosure, a transmission resource can be efficiently managed by preventing unnecessary SPS transmission.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
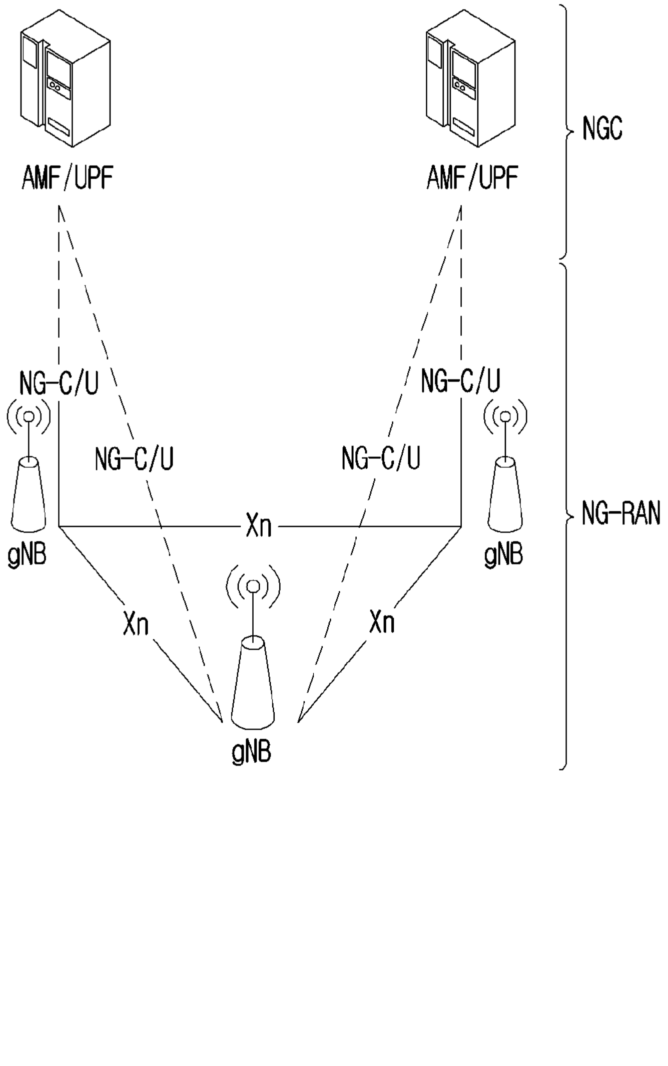
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
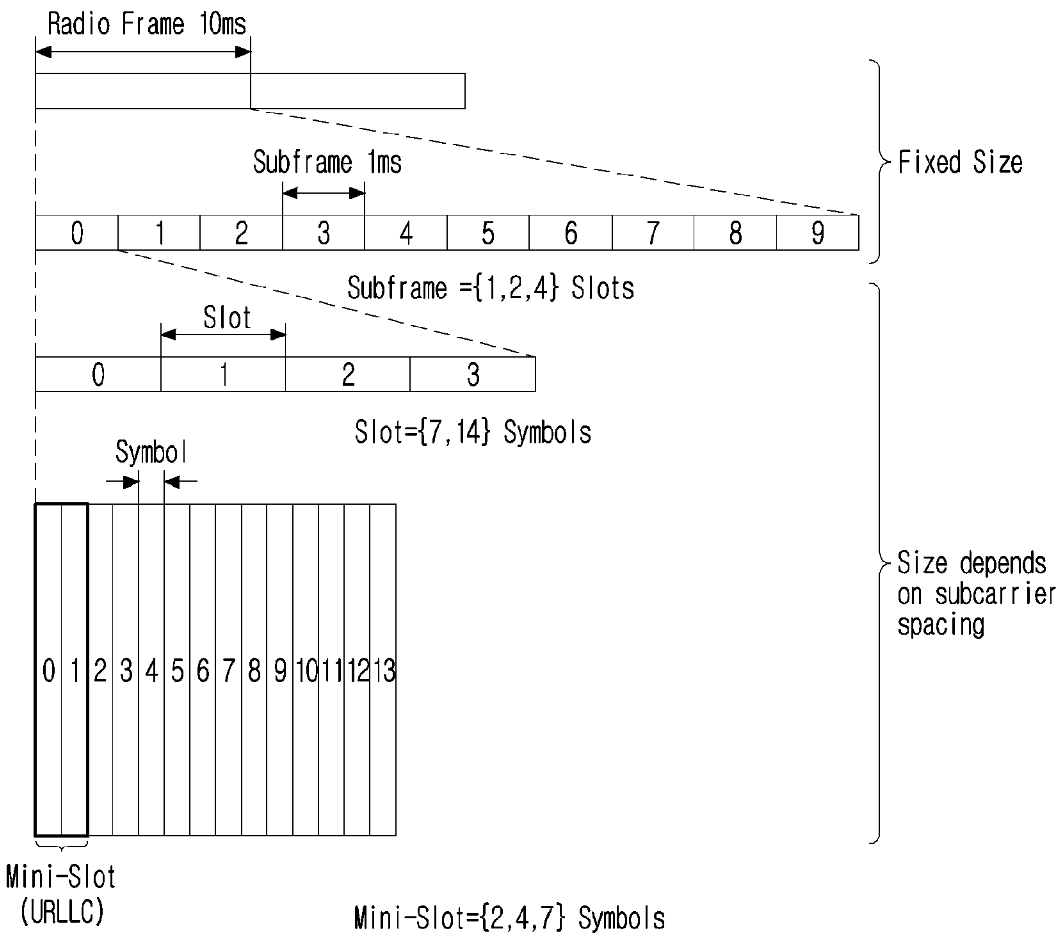
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu$ ($\{0, \ldots, N_{slot}^{subframe,\mu}-1\}$ in a subframe and are numbered in an increasing order of $n_{s,f}^\mu\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=^2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
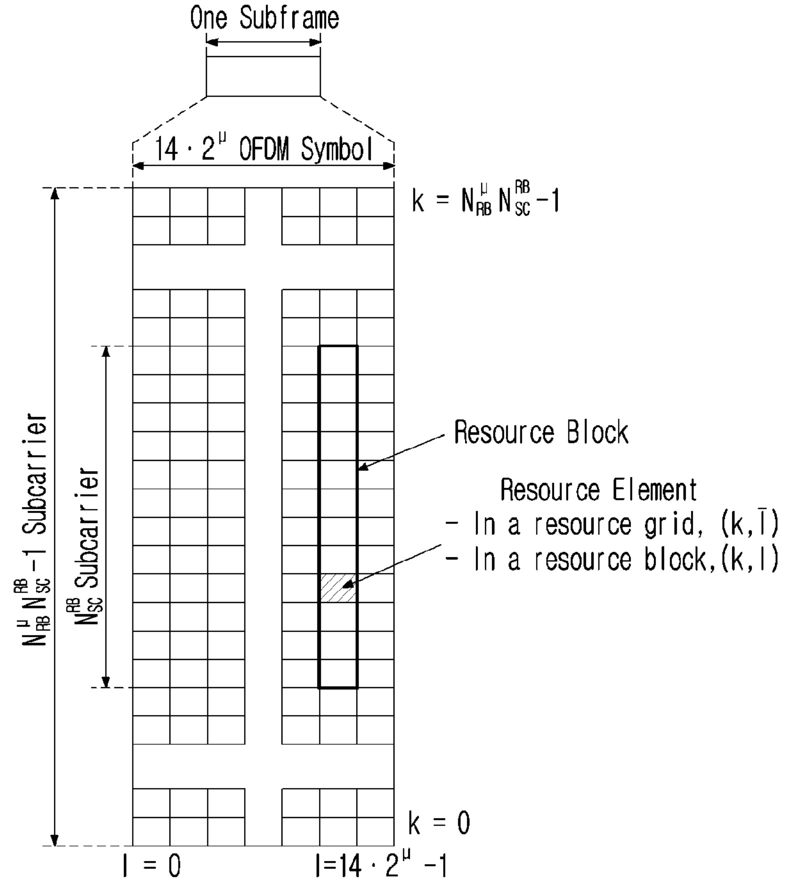
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n^{\mu}_{CRB} = \left\lfloor \frac{k}{N^{RB}_{sc}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \qquad \text{[Equation 2]}$$

$N_{BWP,i}^{start,\mu}$ is a common resource block that a BWP starts relatively to common resource block 0.

Figure 4:
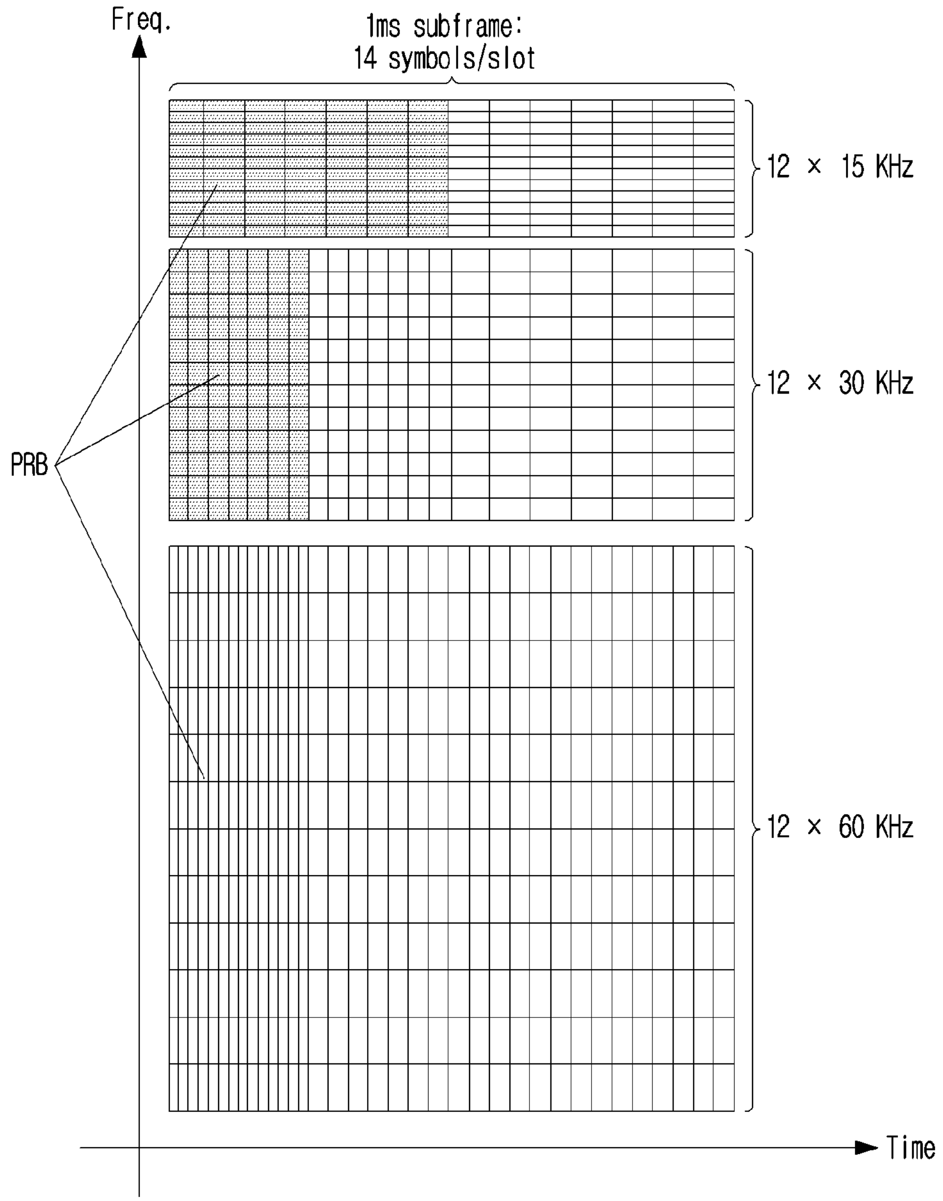
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
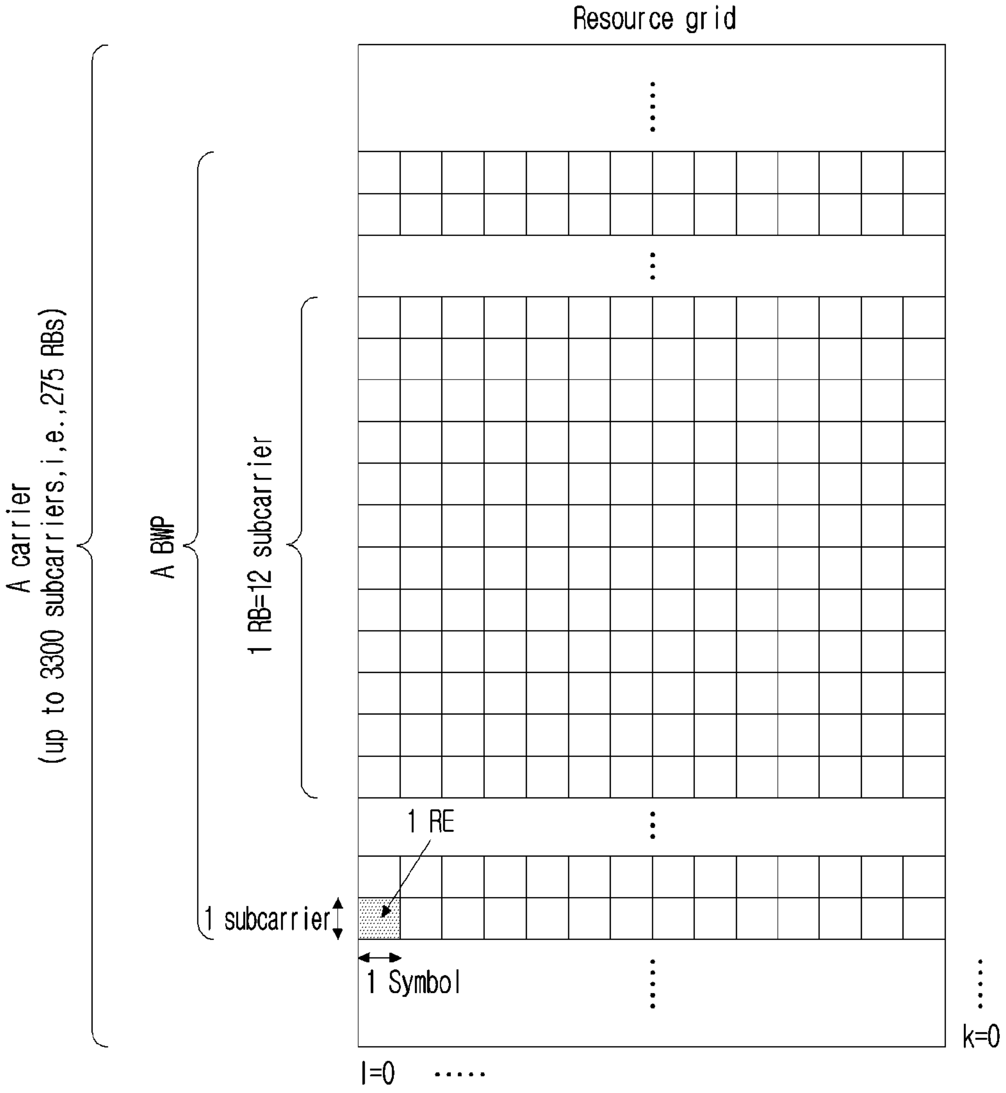
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
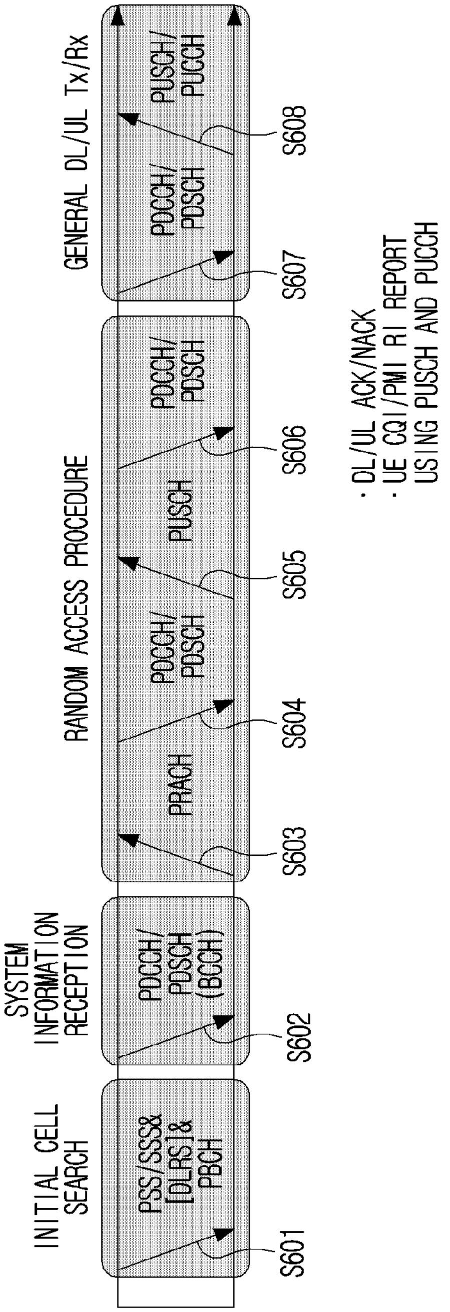
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Downlink Semi-Persistent Scheduling (SPS)

In downlink SPS, persistent scheduling through higher layer signaling (RRC, etc.) and dynamic scheduling of lower layer signaling (DCI, etc.) are combined. Persistent scheduling is used for periodic resource allocation for an initial transmission of a transport block (TB). Dynamic scheduling is used for resource allocation for retransmission when retransmission is required.

A UE may report support of SPS to a base station using a downlinkSPS flag in UE capability information.

For SPS, RRC signaling and physical layer signaling on a PDCCH are combined and used. RRC signaling (e.g., SPS-Config IE) provides a subset of resource allocation information, and additional information is provided by a PDCCH. In addition, a PDCCH is used as a trigger of activation/release.

Table 6 illustrates an example of the SPS-Config IE. SPS-Config IE is used to configure downlink semi-persistent transmission. Multiple downlink SPS configurations in one BWP of a serving cell may be configured.

TABLE 6

```
-- ASN1START
-- TAG-SPS-CONFIG-START
SPS-Config ::=              SEQUENCE {
   periodicity                 ENUMERATED {ms10, ms20, ms32, ms40, ms64, ms80,
ms128, ms160, ms320, ms640,
                                  spare6, spare5, spare4, spare3,
spare2, spare1},
   nrofHARQ-Processes          INTEGER (1..8),
   n1PUCCH-AN                  PUCCH-ResourceId
OPTIONAL,    -- Need M
   mcs-Table                   ENUMERATED {qam64LowSE}
OPTIONAL,    -- Need S
   ...,
   [[
   sps-ConfigIndex-r16         SPS-ConfigIndex-r16
OPTIONAL,    -- Cond SPS-List
```

TABLE 6-continued

```
  harq-ProcID-Offset-r16          INTEGER (0..15)
OPTIONAL,   -- Need R
  periodicityExt-r16              INTEGER (1..5120)
OPTIONAL,   -- Need R
  harq-CodebookID-r16             INTEGER (1..2)
OPTIONAL,   -- Need R
  pdsch-AggregationFactor-r16     ENUMERATED {n1, n2, n4, n8 }
OPTIONAL    -- Need S
  ]]
}
-- TAG-SPS-CONFIG-STOP
-- ASN1STOP
```

In Table 6, the periodicity represents a period of a downlink SPS, which means a time duration between continuous persistent resource allocations. The periodicityExt is used to calculate a period of downlink SPS, and if this parameter does not exist, the periodicity is ignored. An SPS period has different supported values depending on configured subcarrier spacing.

The nrofHARQ-Processes represents a number of a HARQ process configured for downlink SPS. In the case of dynamic resource allocation, a HARQ process identifier is specified in DCI associated with each resource allocation. However, in downlink SPS, an identifier of a HARQ process is determined based on the nrofHARQ-Processes value and the periodicity value.

The n1PUCCH-AN indicates a HARQ resource of a PUCCH for downlink SPS. An actual PUCCH-Resource is configured according to the value of n1PUCCH-AN, and based on this, a PUCCH resource for transmitting a HARQ ACK to a base station are identified.

The mcs-Table indicates an MCS table used by a UE for downlink SPS.

The pdsch-AggregationFactor indicates the number of repetitions of an SPS PDSCH and may have one value among {1,2,4,8}. If this field does not exist, a UE applies pdsch-AggregationFactor of PDSCH-Config. That is, a UE repeatedly receives the same downlink data/transport block (TB) in consecutive slots.

When a scheduled PDSCH is received without corresponding PDCCH transmission using SPS-config, the same symbol allocation is applied over consecutive slots according to the configured repetition number (pdsch-AggregationFactor). That is, a UE repeatedly receives a downlink TB in the same symbol over several consecutive slots according to the configured number of repetitions. When repetitive transmission is configured, a PDSCH is limited to a single transmission layer.

In a PDSCH scheduled without corresponding PDCCH transmission using SPS-config, a time duration for reception according to the number of repetitions (pdsch-AggregationFactor) is not greater than a duration derived by a period obtained from SPS-config.

A redundancy version (rv_id) is determined differently for each TO of a TB. In a PDSCH scheduled without corresponding PDCCH transmission using SPS-config, it is assumed that a redundancy version indicated by DCI is 0.

After downlink assignment is configured for SPS, a MAC entity sequentially considers that the Nth (N≥0) downlink assignment is generated within a slot according to Equation 3 below. That is, when SPS is configured, an SPS PDSCH may be transmitted at a transmission occasion/opportunity that satisfies Equation 3 below.

$$(numberOfSlotsPerFrame \times SFN + \text{slot number in the frame}) = [(numberOfSlotsPerFrame \times SFN_{start\ time} + \text{slot}_{start\ time}) + N \times \text{periodicity} \times numberOfSlotsPerFrame/10] \ modulo\ (1024 \times numberOfSlotsPerFrame) \quad \text{[Equation 3]}$$

In Equation 3, numberOfSlotsPerFrame represents a number of slots per frame. $SFN_{start\ time}$ and $slot_{start\ time}$ are an SFN and a slot of the first transmission of a PDSCH in which a DL assignment configured for an SPS configuration was (re) initialized, respectively. In other words, $SFN_{start\ time}$ and $slot_{start\ time}$ are an SFN number and a slot number of the first PDSCH allocated based on a TDRA field in DCI, respectively. A configured DL allocation may be configured as a set of periodic SPS PDSCH occasions for an SPS configuration. The periodicity represents a period of DL SPS (see Table 6).

Meanwhile, in the case of dynamic resource allocation on a PDCCH, an HARQ process ID (HARQ process identity) is specified in DCI, whereas in the case of SPS, since DCI is not received before each PDSCH transmission, a HARQ process is calculated according to Equation 4 or 5 below. A base station may configure the number of HARQ processes (e.g., nrofHARQ-Processes) and an offset (e.g., harq-ProcID-Offset) used to derive a HARQ process ID.

If an offset (e.g., harq-ProcID-Offset) used to derive a HARQ process ID is not configured, a UE derives a HARQ process ID associated with a slot in which downlink transmission starts from Equation 4 below. Alternatively, if an offset (e.g., harq-ProcID-Offset) used to derive a HARQ process ID is configured, a UE derives a HARQ process ID associated with a slot in which downlink transmission starts from Equation 5 below.

$$HARQ\ \text{Process}\ ID = [\text{floor}\ (\text{CURRENT\_slot} \times 10/(numberOfSlotsPerFrame \times \text{periodicity}))]\ modulo\ nrofHARQ\text{–Processes} \quad \text{[Equation 4]}$$

$$HARQ\ \text{Process}\ ID = [\text{floor}\ (\text{CURRENT\_slot} \times 10/(numberOfSlotsPerFrame \times \text{periodicity}))]\ modulo\ nrofHARQ\text{–Processes} + harq\text{–}ProcID\text{–Offset} \quad \text{[Equation 5]}$$

In Equations 4 and 5, nrojHARQ-Processes defines the number of downlink HARQ processes and may have a value from 1 to 8 (see Table 6). nrojHARQ-Processes is used to identify a HARQ process ID for specific PDSCH transmission.

Discontinuous Reception (DRX) Operation

A UE configured with DRX may discontinuously receive a DL signal to reduce power consumption. DRX can be performed in RRC_IDLE state, RRC_INACTIVE state, and RRC_CONNECTED state.

Hereinafter, DRX operation in the RRC_CONNECTED state will be described.

In RRC_CONNECTED state, DRX is used for discontinuous reception of a PDCCH. For convenience, DRX performed in RRC_CONNECTED state is referred to as RRC_CONNECTED DRX.

Figure 7:
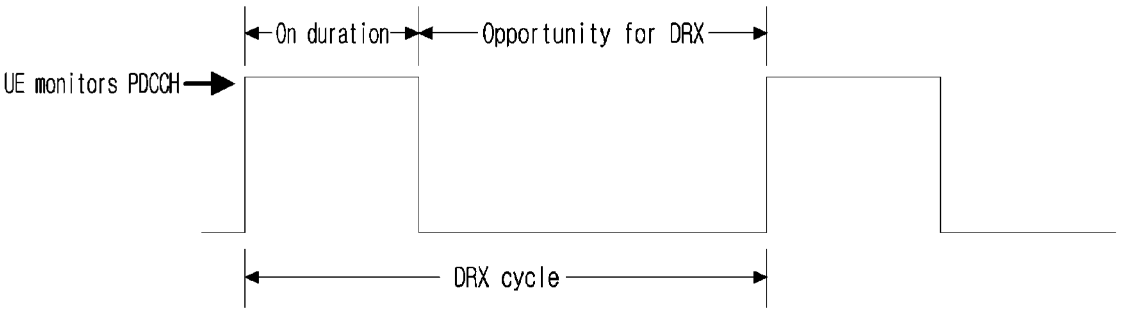
FIG. 7 is a diagram illustrating a DRX cycle in a wireless communication system to which the present disclosure may be applied.

FIG. 7 is a diagram illustrating a DRX cycle in a wireless communication system to which the present disclosure may be applied.

Referring to FIG. 7, a DRX cycle is composed of On Duration and Opportunity for DRX. A DRX cycle defines a time interval at which On Duration is periodically repeated. On Duration represents a time duration monitored by a UE to receive a PDCCH. When DRX is configured, a UE performs PDCCH monitoring during On Duration. If there is a successfully detected a PDCCH during PDCCH monitoring, a UE operates an inactivity timer and maintains an awake state. On the other hand, if there is no successfully detected PDCCH during PDCCH monitoring, a UE enters a sleep state after On Duration ends. Therefore, when DRX is configured, PDCCH monitoring/reception may be performed discontinuously in a time domain in performing the procedure and/or method described/proposed above.

Table 7 illustrates a process of a UE related to DRX (RRC_CONNECTED state).

TABLE 1

| | Signal type | UE procedure |
|---|---|---|
| First step | RRC signaling (MAC-CellGroupConfig) | Receive DRX configuration information |
| Second step | MAC CE ((long) DRX command MAC CE) | Receive DRX command |
| Third step | — | PDCCH monitoring during On Duration of DRX cycle |

Referring to Table 7, DRX-related configuration information is received through higher layer (e.g., RRC) signaling (e.g., DRX-Config), and whether DRX is ON/OFF is controlled by a DRX command MAC CE of a MAC layer. When DRX is configured, a UE may discontinuously perform PDCCH monitoring as illustrated in FIG. 7.

Here, configuration information (MAC-CellGroupConfig) for a MAC cell group includes configuration information necessary to configure MAC parameters for a cell group. MAC-CellGroupConfig may also include DRX-related configuration information (e.g., DRX-Config). For example, DRX configuration information (e.g., DRX-Config) may include the following information to define DRX.

drx-onDurationTimer: Defines a duration in time of a DRX cycle.

drx-SlotOffset: Defines a delay before a start of drx-onDurationTimer.

drx-InactivityTimer: Defines a duration after a PDCCH occasion indicating a new UL, DL or SL for a MAC entity.

drx-RetransmissionTimerDL: Defines a maximum period until a DL retransmission is received.

drx-RetransmissionTimerUL: Defines a maximum period until a grant for UL retransmission is received.

drx-LongCycleStartOffset: Indicates a long DRX cycle, and also defines a subframe in which long and short DRX cycles start.

drx-ShortCycle (optional): Defines a short DRX cycle.

drx-ShortCycleTimer (optional): Defines a period during which a UE should follow a short DRX cycle.

drx-HARQ-RTT-TimerDL: Defines a minimum period until DL assignment for HARQ retransmission expected by a MAC entity.

drx-HARQ-RTT-TimerUL: Defines a minimum period until a UL HARQ retransmission grant expected by a MAC entity.

If short DRX and long DRX operations are described in more detail, first, after receiving a PDCCH indicating initial UL or DL data, a DRX inactivity timer (drx-InactivityTimer) starts/restarts, and a UE maintains an awake state until the DRX inactivity timer (drx-InactivityTimer) expires.

When the DRX inactivity timer (drx-InactivityTimer) expires, a short DRX cycle may be selectively performed. That is, a base station can configure a UE to use a short DRX cycle by including a short DRX parameter set (i.e., drx-ShortCycle, drx-ShortCycleTimer) in DRX-Config. 1*n* other words, if the short DRX parameter set in DRX-Config is not configured, a UE can use a long DRX cycle described later. During a period of a short DRX cycle, if [(SFN×10)+subframe number] modulo (drx-ShortCycle)=(drx-StartOffset) modulo (drx-ShortCycle) is satisfied at a beginning of a specific subframe, a DRX active period starts after a DRX offset (drx-SlotOffset).

A UE maintains a DRX active state for a period defined by a DRX on-duration timer (drx-onDurationTimer). When data transmission is initiated during a DRX active period, a DRX inactivity timer (drx-InactivityTimer) is restarted, and then the above-described operation proceeds.

When a period (drx-ShortCycle×drx-ShortCycleTimer) of a short DRX cycle ends, a long DRX cycle starts. Alternatively, when a short DRX parameter set in DRX-Config is not configured, a long DRX cycle may start when a DRX inactivity timer (drx-InactivityTimer) expires. During a period of a long DRX cycle, if [(SFN×10)+subframe number] modulo (drx-LongCycle)=drx-StartOffset is satisfied at a beginning of a specific subframe, a DRX active period starts after a DRX offset (drx-SlotOffset).

In addition, if the UE becomes in a DRX inactive state after transmitting uplink data on a PUSCH, a UE needs to temporarily return to a DRX active state in order to check a retransmission request from a base station. A DRX UL HARQ round trip time (RTT) timer (drx-HARQ-RTT-TimerUL) designates return timing to a DRX active state related to an end of the first repetition of PUSCH transmission (end of PUSCH transmission if PUSCH repetition is not configured). That is, when a DRX UL HARQ round trip time (RTT) timer (drx-HARQ-RTT-TimerUL) expires, a UE switches from DRX inactive to DRX active. A UE maintains a DRX active state for a period defined by a DRX UL retransmission timer (drx-RetransmissionTimerUL).

Similarly, if a UE enters a DRX inactive state after receiving downlink data on a PDSCH and a UE transmits a negative acknowledgment (NACK) for the corresponding data on the PUCCH, a UE needs to return to a DRX active state to receive retransmission from a base station. In this case, a DRX DL HARQ RTT timer (drx-HARQ-RTT-TimerDL) starts after a UE transmits a NACK through a PUCCH. That is, when a DRX DL HARQ RTT timer (drx-HARQ-RTT-TimerDL) expires, a UE switches from DRX inactive to DRX active. A UE maintains a DRX active state for a period defined by a DRX DL retransmission timer (drx-RetransmissionTimerDL).

Meanwhile, in order for a UE to immediately enter a DRX inactive state without waiting for a DRX inactivity timer (drx-InactivityTimer) to expire, a DRX command MAC CE (DRX command MAC CE), a long DRX command MAC CE (long DRX command MAC CE) CE) is used. The DRX command MAC CE instructs a UE to enter a DRX inactive state. When short DRX is configured, a UE starts a short DRX cycle, and when short DRX is not configured, a UE starts a long DRX cycle. The long DRX command MAC CE instructs a UE to enter a DRX inactive state and start a long DRX cycle.

Method for transmitting and receiving a semi-persistent scheduling (SPS) PDSCH

In the present disclosure, when image information of an extended reality (XR) service is transmitted through preconfigured resources such as semi-persistent scheduling (SPS) of the NR wireless communication system, a method for reducing power consumption and increasing efficiency of radio resources while guaranteeing availability and reliability of transmission resources is proposed.

In NR, one or more SPS PDSCHs may be configured for a UE for periodic transmission and reception or low delay time and PDCCH overhead. In each SPS configuration, a configuration/indicated resource may be repeated with a period. That is, initially configured/indicated resource allocation is repeated with a configured periods and a UE can receive downlink transmission from corresponding resources without a separate PDCCH reception process.

Meanwhile, there are various types of data that can be generated in XR. Among these data, it is considered that transmission and reception of sensor and location information and video data of a UE, which are generally reported with a specific period, are transmitted and received in SPS resources. Data generation time (traffic arrival time) for such data is not always constant and jitter may occur due to reasons such as a video encoding time, a sensor measurement time, an operation of a higher layer, or a routing change of a network to be delivered.

If a resource is allocated to a location sufficiently distant in time from an expected traffic generation point in consideration of jitter, etc., availability of a resource can be guaranteed, but a delay time may occur. Conversely, if an SPS resource with a fixed period is allocated at a time of expected data generation, a larger delay may occur due to a waiting time until a next available resource when jitter occurs.

In addition, since some data are generated based on events, it is impossible to accurately determine an actual data generation time, but it is considered to use SPS resources for these data in order to reduce a delay caused by scheduling. In this case, skipping methods in which a sufficient number of resources are allocated in a short period in preparation for data generation, a UE or a base station selectively uses these resources, and other resources are not actually used are conventionally discussed. However, in order to use the method of skipping transmission and reception, it is necessary to consider response signals between a UE and a base station for conforming reception and transmission. If a UE transmits a response signal even for unreceived transmission, a base station needs to always prepare a resource for the UE to transmit a response signal. And, for these resources, considering that the skipping method is based on configuring a sufficiently large number of resources in radio resources, it may occur as a large uplink burden. In addition, considering that these resources can be multiplexed between UEs, a burden of uplink resources should be considered more importantly.

Since securing low latency is essential for a quality of XR service, it is necessary to consider a method of minimizing an effect on latency while reducing an effect of jitter. In order to solve this problem, the present disclosure deals with a method of selectively using some of a plurality of SPS resources configured between a UE and a base station and simplifying and transmitting a response to the used SPS resources at a predetermined location.

A group of pictures (GOP) of video coding may include the following picture types.

An I picture or I frame (i.e., an intra coded picture) (which may also be referred to as a key frame or an i-frame) is a picture that is coded independently of all other pictures. Each GOP starts with a picture of this type (in decoding order).

A P picture or P frame (i.e., a predictive coded picture) includes motion-compensated difference information relative to previously decoded pictures. For example, in older designs such as H.262/MPEG-2 and H.263, each P picture can only refer to one picture, the corresponding picture should precede the P picture in display order and decoding order, and should be an I or P picture. These restrictions do not apply to the new standards H.264/MPEG-4 AVC and HEVC.

A B picture or B frame (bipredictive coded picture) includes motion-compensated difference information relative to previously decoded pictures. For example, in MPEG-1 and older designs such as H.262/MPEG-2, each B-picture can only refer to two pictures, one precedes the B picture in display order and the other follows the B picture, and all referenced pictures should be either I or P pictures. These restrictions do not apply to the new standards H.264/MPEG-4 AVC and HEVC.

A D picture or D frame (direct coded (DC) picture) serves as a fast access indication of a picture for loss robustness or fast-forward. D pictures are used only in MPEG-1 video.

Figure 8:
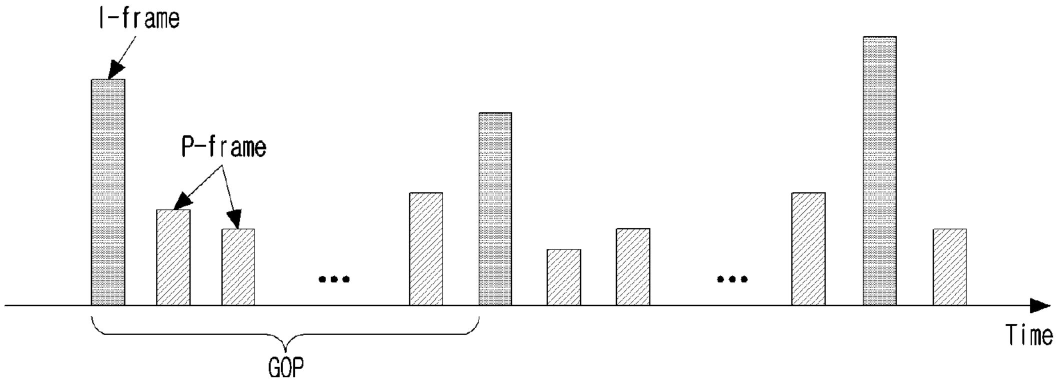
FIG. 8 illustrates a structure/pattern of a group of pictures.

FIG. 8 illustrates a structure/pattern of a group of pictures.

Referring to FIG. 8, an I frame indicates a start of a GOP. This is followed by several P and B frames. In the previous design, an ordering and a reference structure allowed were relatively limited.

A GOP structure is often referred to by two numbers, e.g., M=3, N=12. The first number (M) represents a distance between two anchor frames (I or P). The second number (N) is a GOP size that informs a distance between two full images (I-frames). For example, in the case of M=3 and N=12, a GOP structure is IBBPBBPBBPBBI. Instead of the M parameter, the maximum number of B frames between two consecutive anchor frames may be used.

For example, in a sequence with the pattern IBBBBPBBBBPBBBBI, a GOP size (N value) is 15 (a length between two I frames) and a distance (M value) between two anchor frames is 5 (a length between an I frame and a P frame or between two consecutive P frames).

An I frame includes a full image and no additional information is required to reconstruct it. Generally, an encoder use a GOP structure that allows each I frame to be a “clean random access point”. Thus, decoding can start cleanly at an I-frame and any errors in a GOP structure are corrected after processing a correct I-frame.

Hereinafter, the present disclosure describes a method proposed based on semi-static downlink SPS radio resources, but this is for convenience of description, the methods proposed in the present disclosure are not limited thereto. Accordingly, those skilled in the art can understand that the methods proposed in the present disclosure can be extended and applied to a radio resource through dynamic scheduling received by a UE. For example, a method in which a UE determines one HARQ-ACK timing for a plurality of allocated downlink radio resources may be applied regardless of an SPS PDSCH or a PDSCH indicated by dynamic scheduling. In addition, the methods proposed in the present disclosure can be applied even when a plurality of radio resources are not semi-statically configured but set through dynamic indication, for example, when a plurality of radio resources are configured at once through DCI. Accordingly, the methods proposed in the present disclosure can be applied to all types of transmission/reception schemes expected by a base station and a UE as long as the principle of the proposed method is not infringed, even if there is no separate explanation. Hereinafter, in the present disclosure, for convenience of description, semi-persistent scheduling (SPS) can be used as a general concept collectively referring to semi-statically configured radio resources (e.g., DL/UL SPS, CG).

In the present disclosure, a transmission occasion/opportunity (TO) means a radio resource (e.g., SPS PDSCH) configured for SPS use. In a transmission occasion, a subject performing transmission (i.e., base station in case of downlink, UE in case of uplink) can attempt transmission in a TO, and a receiver (i.e., UE in case of downlink, base station in case of uplink) can expect transmission in each TO and attempt reception.

Hereinafter, in the present disclosure, an example is described based on the NR system to explain the principle of the proposed method, but the proposed methods are not specifically limited to the transmission and reception scheme of the NR unless otherwise specified. In addition, in the present disclosure, an example is described based on the characteristics and structure of the XR service to explain the principle of the proposed method, but the proposed methods are not specifically limited to supporting the XR service unless otherwise specified. Accordingly, the methods proposed in the present disclosure can be applied to all wireless communication transmission/reception structures and services as long as the principle of the proposed method is not infringed, even if there is no separate explanation.

Hereinafter, the present disclosure proposes a method of temporarily suspending or resuming SPS transmission and reception based on an SPS window, an SPS mask, or an active time for an activated SPS configuration. Through this, it is possible to prevent unnecessary SPS transmission and reception by operating activated SPS transmission and reception based on an SPS window, an SPS mask, or an active time, thereby reducing power consumption of a UE and a base station and efficiently using resources.

To this end, the method proposed in the present disclosure may include a method of allocating SPS radio resources to a UE by a base station and a method of receiving and transmitting SPS resources. In addition, the method proposed in the present disclosure may include a method of transmitting a HARQ-ACK PUCCH response for an SPS PDSCH reception result and a method of receiving retransmitted DCI of a base station through a PDCCH thereafter. In addition, the method proposed in the present disclosure may include a process in which a UE transmits a signal and a channel for informing its capability and/or service requirement, and a base station receives the signal and the channel.

As the method proposed in the present disclosure, some of the following methods may be selected and applied. In addition, each of the methods proposed in the present disclosure can be operated in an independent scheme without a combination, or one or more methods can be combined and operated in an associated scheme. Some terms, symbols, and sequences used to describe the method proposed in the present disclosure may be substituted with other terms, symbols, and sequences as long as the principles of the present disclosure are maintained.

In the present disclosure, the following SPS configuration activation/deactivation and transmission/reception operation, etc. may be supported. the following SPS configuration, activation/deactivation, transmission/reception operations, etc. can be combined with the methods proposed in this disclosure.

Figure 9:
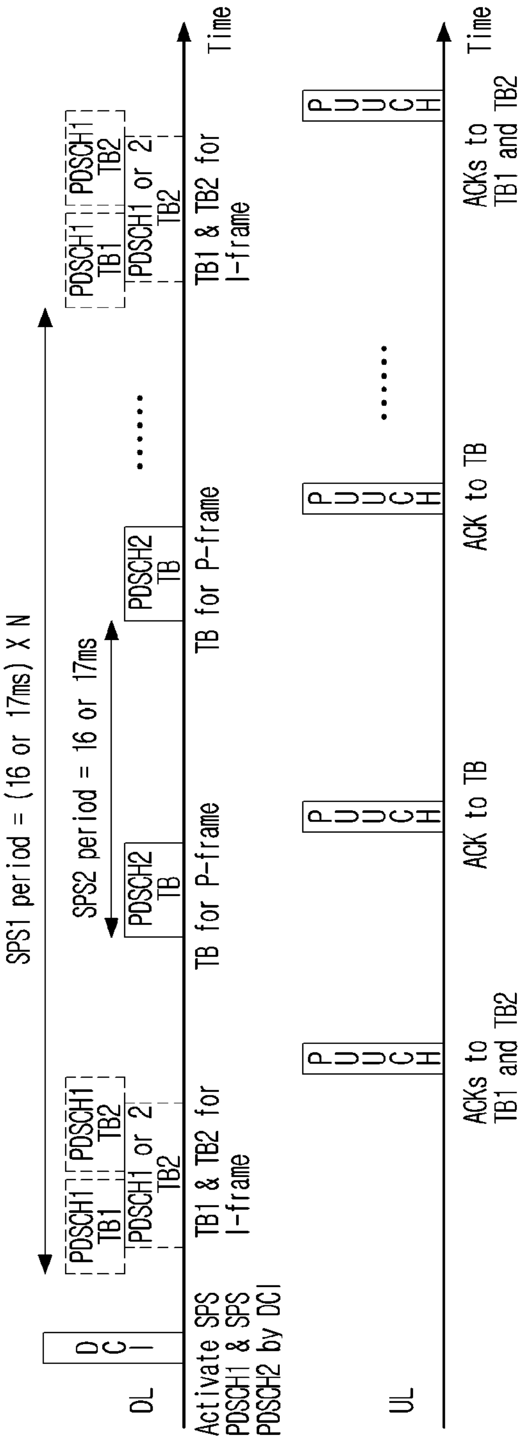
FIG. 9 illustrates a plurality of SPS configurations according to an embodiment of the present disclosure.

FIG. 9 illustrates a plurality of SPS configurations according to an embodiment of the present disclosure.

A plurality of SPSs (for example, SPS1 and SPS2 in the case of two SPSs) can be configured as one SPS group with SPS configurations connected/associated with each other, and SPS1 may be configured as a primary SPS, and SPS2 may be configured as a secondary SPS. Here, secondary SPS may be SPS activated or received according to transmission of primary SPS. For example, an SPS configuration for SPS PDSCH 1 in FIG. 9 is a primary SPS configuration, an SPS configuration for SPS PDSCH 2 is a secondary SPS configuration, and the two SPS configurations can be configured as one SPS group.

Primary SPS and secondary SPS may be configured to different SPS configuration indexes. Alternatively, primary SPS and secondary SPS are configured to the same SPS configuration index, however may be divided into primary/secondary SPS indicators or different sub-indexes by an RRC message, a MAC CE, or DCI.

i) When DCI indicates SPS1 and also indicates activation, a UE may activate SPS2 at the same time as activating SPS1 or after a predetermined time.

ii) Alternatively, when DCI indicates both SPS1 and SPS2 and also indicates activation, a UE may activate SPS2 simultaneously with activating SPS1 or after a predetermined time. For example, FIG. 9 illustrates a case in which activation is indicated for both an SPS configuration for SPS PDSCH 1 and an SPS configuration for SPS PDSCH 2 by one DCI. In addition, a case in which an SPS configuration for SPS PDSCH 1 and an SPS configuration for SPS PDSCH 2 are simultaneously activated is exemplified.

Here, DCI may include all different SPS configuration indices for SPS1 and SPS2.

Alternatively, DCI may include an SPS configuration index for SPS1 and indicate a secondary SPS indicator.

Alternatively, DCI may include an SPS configuration index for SPS2 and indicate a primary SPS indicator.

Alternatively, DCI may include an SPS configuration index for SPS1 or SPS2 and may include a sub-index for SPS2 or SPS1.

Alternatively, DCI may indicate a common SPS configuration index for SPS1 and SPS2. For example, among a HARQ process identity (ID) values indicating an SPS configuration index, a value between 1 and 8 is configured as the conventional SPS configuration index (i.e., to indicate a single SPS configuration), and a HARQ process ID value exceeding 8 may be configured as an SPS configuration index indicating a plurality of connected SPSs simultaneously.

Alternatively, DCI may include all different SPS configuration sub-indexes for SPS1 and SPS2.

A base station may configure different video frame types (e.g., I-frame and P-frame) with different logical channels. Accordingly, through s value of s logical channel identifier (LCID) field included in s sub-header of a MAC protocol data unit (PDU) (i.e., transport block (TB)), a UE can distinguish data for different video frames. Here, a base station may configure different logical channels for different video frame types to be mapped to different SPSs. Here, SPS1 and SPS2 may be mapped to the same or different logical channels.

For example, referring to FIG. 9, different logical channels may be configured/allocated to an I-frame and a P-frame. Also, a logical channel for an I-frame may be mapped to SPS for SPS PDSCH 1, and a logical channel for a P-frame may be mapped to SPS for SPS PDUSCH 2.

Activation or transmission/reception of SPS2 may be determined depending on whether SPS1 is activated or transmitted/received. Here, activation of SPS2 may be configured to occur simultaneously with or after activation of SPS1.

A UE can expect SPS2 PDSCH transmission to occur only after SPS1 PDSCH transmission. Accordingly, reception of an SPS2 PDSCH in the next period may be determined depending on whether or not an SPS1 PDSCH is received.

When an SPS1 PDSCH and an SPS2 PDSCH are transmitted/allocated by TDM or FDM in the same period or a partially overlapping period, when receiving an SPS1 PDSCH, a UE may determine that an SPS2 PDSCH resource are not available or to skip SPS2 PDSCH reception. Alternatively, a UE may deactivate SPS2 or deactivate activated SPS2. For example, as shown in FIG. 9, an SPS configuration for an SPS PDSCH 1 may be configured to a period of N times 16 ms or 17 ms (N is a natural number), and an SPS configuration for an SPS PDSCH 2 may be configured to a period of 16 ms or 17 ms. In addition, an SPS configuration for N SPS PDSCH 2 may overlap within one period of SPS configuration for an SPS PDSCH 1. That is, as shown in FIG. 9, in the first period of an SPS PDSCH 2, an SPS PDSCH 2 and an SPS PDSCH 1 may be allocated as TDM or FDM. In this case, a resource of an SPS PDSCH 2 (PDSCH 2 carrying TB2 for I-frame in FIG. 9) may be determined to be invalid or transmission of an SPS PDSCH 2 may be determined to be skipped.

When an SPS1 PDSCH and an SPS2 PDSCH are transmitted/allocated by TDM or FDM in the same slot, or when SPS1 PDSCH and SPS2 PDSCH resources overlap, a UE can prioritize SPS1 PDSCH reception regardless of an SPS configuration index of SPS1 and SPS2. That is, in this case, a UE may skip receiving an SPS2 PDSCH resource and receive and decode an SPS1 PDSCH resource. For example, as shown in FIG. 9, an SPS PDSCH 2 (PDSCH 2 carrying TB2 for I-frame in FIG. 9) may be skipped and only an SPS PDSCH 1 resource may be received.

When a HARQ-ACK (ACK/NACK, A/N or acknowledgment/negative acknowledgment) PUCCH for an SPS1 PDSCH and an A/N PUCCH for an SPS2 PDSCH are allocated to the same slot, a UE may multiplex and transmit a HARQ-ACK for an SPS1 PDSCH and a HARQ-ACK for an SPS2 PDSCH to an A/N PUCCH resource of SPS1, which is primary SPS. Alternatively, a UE may transmit a HARQ-ACK for an SPS1 PDSCH and drop a HARQ-ACK for an SPS2 PDSCH.

Alternatively, a base station and a UE may configure an A/N PUCCH resource for primary SPS, but may not configure an A/N PUCCH resource for secondary SPS.

Alternatively, an A/N PUCCH resource may be configured only for one SPS among primary SPS and secondary SPS.

Alternatively, when both primary SPS and secondary SPS are activated, and both an A/N PUCCH resources for primary SPS and an A/N PUCCH resources for secondary SPS are configured, an A/N PUCCH for secondary SPS can be invalidated. Here, when only primary SPS or only secondary SPS is activated, a HARQ-ACK may be transmitted as an A/N PUCCH resource for activated SPS.

When a base station configures and activates periodic radio resources (e.g., SPS) to a UE, the base station may allocate a plurality of radio resources to the UE within one period. In a plurality of radio resources, the same time/frequency resource allocation in a slot is repeated at regular intervals (e.g., M (M is a natural number) slot) (e.g., radio resources of 3 symbols per slot are repeatedly allocated to the same location), or radio resources having the same length may be consecutively and repeatedly allocated to consecutive symbols with the first radio resource (e.g., radio resources of 3 symbols are then repeatedly allocated). The number of radio resources N (where N is a natural number) may be determined by L1 signaling and/or higher layer signaling. For example, although FIG. 9 illustrates a case in which only one radio resource is allocated to both SPS PDSCH 1 and SPS PDSCH 2 in one period, a plurality of radio resources may be allocated in one period.

A base station/UE may perform transmission using one or a part of a plurality of SPS radio resources in the period according to a traffic pattern. Here, the fastest radio resource capable of transmitting a transport block (TB) including user data may be selected in consideration of a user data generation time of a base station/UE.

In the present disclosure, a base station may activate a plurality of SPSs connected/associated with each other through one DCI or different DCIs. Here, different SPSs may be mapped to the same or different DL cells. In addition, different SPSs may be mapped to the same or different DL bandwidth parts (BWPs). In addition, different SPSs may be mapped to the same or different resource block (RB) sets. For example, when two SPSs are connected/associated, different periodic SPS PDSCH resources for the two SPSs may be allocated to one or more DL cells, one or more DL BWPs, or one or more RB sets.

Embodiment 1

Based on a window (i.e., available resource(s)/duration) or mask (i.e., unavailable resource(s)/duration) for periodic SPS PDSCH resource(s) (i.e., TO(s)) for activated SPS, an SPS PDSCH may be transmitted using only some SPS PDSCH resources, or SPS PDSCH reception may be skipped in some SPS PDSCH resources.

A base station may configure/operate a window (or mask) for a duration (or TO(s)) where no traffic is expected.

Method 1-1: A base station may configure a periodic or aperiodic SPS window for one or a plurality of specific SPS(s) (i.e., specific SPS configuration index (e.g., sps-ConfigIndex) (s)).

In this case, when the corresponding SPS is activated, a UE may receive an SPS PDSCH by determining that only SPS PDSCH resource(s) within (included) the configured SPS window are valid, and may not receive an SPS PDSCH by determining that SPS PDSCH resource(s) outside the CG window (not included) are invalid. A base station may also not transmit an SPS PDSCH outside (not included) the SPS window in order to reduce power consumption.

Here, an SPS window may be valid only for a certain period of time. For example, an SPS window may be valid only within a specific SPS period(s). As another example, it may be valid only for a certain period of time starting immediately after the SPS window is configured/indicated by RRC/MAC CE/DCI or immediately after transmitting an ACK for the indication. Alternatively, the SPS window may be configured to be continuously valid for a period in which SPS is activated.

Configuration information for this SPS window may be included in and configured in an RRC message (e.g., SPS-config) for configuring SPS, or may be indicated to a UE through a MAC CE or DCI.

In addition, an SPS window may be configured for each SPS configuration index (e.g., SPS-ConfigIndex), for each priority (i.e., priority for SPS), for each cell, or for each DL BWP, or may be configured or indicated each UE. For example, SPS windows can also be prioritized, in this case, an SPS window, which has a higher priority (HP), may be applied only to SPS, which is a HP, and an SPS window, which is a lower priority (LP), may be applied only to SPS, which is an LP.

Configuration information for an SPS window may include an SPS window start time (e.g., slot number/index or TO number/index) and a length (i.e., duration) (e.g., number of slots, number of TOs), and may be specified in units of slots (or units of TO). In addition, in the case of a periodic SPS window, a period of an SPS window may be additionally configured. In addition, if a periodic SPS window has the same periodicity as an SPS period, the SPS period may be applied without additionally configuring a period of the SPS window.

For example, a MAC CE may include an SPS configuration index (e.g., SPS-ConfigIndex) field and the SPS window configuration information. Alternatively, DCI activating SPS in which a cyclic redundancy check (CRC) is scrambled with a CS (configured scheduling)-RNTI or DCI for SPS retransmission may indicate an SPS window start time and a length (i.e., duration) (i.e., in this case, an identification of an SPS configuration index may follow the existing method).

When a UE receives new SPS window configuration information after receiving and applying SPS window configuration information, a UE may release the existing SPS window configuration information and apply the new SPS window configuration information. In this case, since separate signaling for releasing the configuration of the SPS window is not used, signaling overhead can be reduced.

A UE may be configured to start an SPS window timer at the start of an SPS window and stop the SPS window timer at the end of the SPS window. Accordingly, a UE may determine that an SPS PDSCH is valid while the SPS window timer is running. Here, the SPS window timer and an SPS timer may be the same or different.

Method 1-2: A base station may configure a periodic or aperiodic SPS mask for one or a plurality of specific SPS(s) (i.e., specific SPS configuration index (e.g., SPS-ConfigIndex) (s)).

In this case, when corresponding SPS is activated, a UE may receive an SPS PDSCH by determining that only SPS PDSCH resources outside (not included) the configured SPS mask are valid, and may not receive an SPS PDSCH by determining that SPS PDSCH resources exists in (included in) the SPS mask are invalid. A base station may also not transmit an SPS PDSCH within (included) the SPS mask in order to reduce power consumption.

Here, the SPS mask may be valid only for a certain period of time. For example, the SPS mask may be valid only within a specific SPS period(s). As another example, it may be valid only for a certain period of time starting immediately after the SPS mask is configured/indicated by RRC/MAC CE/DCI or immediately after transmitting an ACK for the indication. Alternatively, the SPS mask may be configured to be continuously valid for a period in which SPS is activated.

Configuration information on the SPS mask may be included in and configured in an RRC message (e.g., SPS-config) for configuring SPS, or may be indicated to a UE through a MAC CE or DCI.

In addition, an SPS mask may be configured for each SPS configuration index (e.g., SPS-ConfigIndex), for each priority (i.e., priority for SPS), for each cell, or for each DL BWP, or may be configured or indicated each UE. For example, SPS masks can also be prioritized, in this case, an SPS mask, which has a HP, may be applied only to SPS, which is a HP, and an SPS mask, which is an LP, may be applied only to SPS, which is an LP.

Configuration information for an SPS mask may include an SPS mask start time (e.g., slot number/index or TO number/index) and a length (i.e., duration) (e.g., number of slots, number of TOs), and may be specified in units of slots (or units of TO). In addition, in the case of a periodic SPS mask, a period of an SPS mask may be additionally configured. In addition, if a periodic SPS mask has the same periodicity as an SPS period, the SPS period may be applied without additionally configuring a period of the SPS mask.

For example, a MAC CE may include an SPS configuration index (e.g., SPS-ConfigIndex) field and the SPS mask configuration information. Alternatively, DCI activating SPS in which a CRC is scrambled with a CS-RNTI or DCI for SPS retransmission may indicate an SPS mask start time and a length (i.e., duration) (i.e., in this case, an identification of an SPS configuration index may follow the existing method).

When a UE receives new SPS mask configuration information after receiving and applying SPS mask configuration information, a UE may release the existing SPS mask configuration information and apply the new SPS mask configuration information. In this case, since separate signaling for releasing the configuration of the SPS mask is not used, signaling overhead can be reduced.

A UE may be configured to start an SPS mask timer at the start of an SPS mask and stop the SPS mask timer at the end of the SPS mask. Accordingly, a UE may determine that an SPS PDSCH is valid while the SPS mask timer is running. Here, the SPS mask timer and an SPS timer may be the same or different.

Method 1-3: It may be indicated to skip SPS PDSCH reception in specific SPS PDSCH resource(s) of one or a plurality of activated specific SPS(s) (specific SPS configuration index (e.g., SPS-ConfigIndex) (s)) through DCI or a DL MAC CE.

When DCI indicates skip of SPS PDSCH reception, a CRC of DCI can be scrambled with a CS-RNTI or a separate RNTI. Here, DCI indicates a PUCCH resource, and a UE receiving the DCI may transmit a HARQ ACK for DCI reception with the indicated PUCCH resource (i.e., a PUCCH resource determined based on information indicated by the DCI).

A HARQ process ID indicated by the DCI may be mapped to an SPS configuration index (e.g., SPS-ConfigIndex) of the SPS.

In addition, DCI may indicate activation of the SPS or allocate a retransmission resource. In this case, skip for the SPS may be indicated while indicating activation of the SPS or allocating a retransmission resource.

In addition, the DCI may indicate a skip duration (e.g., a time interval or the number of TO(s)). Here, for example, a skip duration may indicate skipping reception of one or a plurality of allocated SPS PDSCH(s) immediately after receiving DCI or immediately after transmitting an ACK for DCI. As another example, a skip duration may indicate the number of SPS period(s) started immediately after DCI is received or an ACK for DCI is transmitted. In this way, when DCI indicates a skip duration (i.e., if there is a field to indicate a skip duration), skip may be regarded as indicated, whereas skip may be regarded as not indicated when a skip duration is not indicated (i.e., when there is no field to indicate a skip duration).

In addition, when a MAC CE indicates SPS reception skip, a MAC CE may indicate an SPS configuration index (eg, SPS-ConfigIndex) of corresponding SPS and a skip duration (e.g., time interval or the number of TO(s)) of the corresponding SPS.

Here, a skip duration may indicate skipping reception of one or a plurality of allocated SPS PDSCH(s) immediately after receiving a MAC CE or immediately after transmitting an ACK for a MAC CE. Alternatively, a skip duration may indicate the number of SPS period(s) started immediately after receiving a MAC CE or immediately after transmitting an ACK for a MAC CE. In this way, if a MAC CE indicates a skip duration (i.e., if there is a field to indicate a skip duration), skip may be regarded as indicated, whereas skip may be regarded as not indicated if a skip duration is not indicated (i.e., when there is no field to indicate a skip duration).

Method 1-4: According to specific uplink transmission (e.g., PUSCH, PUCCH, uplink traffic, uplink control information (UCI), etc.) transmitted by a UE, SPS PDSCH reception for specific SPS (e.g., connected/associated with the specific uplink transmission) may be resumed or skipped. For example, according to UCI transmission, PUCCH transmission, or CG PUSCH transmission for pose indicating pose information of a user of a UE or including pose information, a base station and a UE may resume or skip reception of an SPS PDSCH of one or a plurality of specific SPS(s) associated with pose information.

For example, a UE supporting virtual reality (VR) may report pose information according to a motion of a user wearing a VR UE to a base station. For example, a VR UE may transmit pose information to a base station at intervals of 4 ms.

To this end, for example, a base station may configure/allocate a separate logical channel for transmitting pose information, and may configure it to map/link to a specific configured grant. And, the specific configured grant may be configured/defined for uplink transmission of only data of a logical channel for pose. Here, the specific CG PUSCH resource may transmit piggybacked UCI together (i.e., transmit TB and UCI together), and for example, this UCI may indicate whether pose information is changed. For example, if there is a user's pose change of more than a threshold compared to immediately before 4 ms (i.e., detected by a UE), 1 may be indicated as UCI, and 0 may be indicated otherwise. Alternatively, if there is a pose change compared to immediately before 4 ms (i.e., detected by a UE), 1 may be indicated as UCI, and 0 may be indicated if there is no pose change. Alternatively, if a plurality of step-by-step thresholds are defined/configured, the largest pose change can be indicated as 11, less pose changes as 10, less pose changes as 01, and no pose change as 00. A bit value indicated in the above-described UCI is only one example, and the present disclosure is not limited thereto.

Meanwhile, a TB of a PUSCH for pose may include pose information of a higher layer.

In addition, if there is no pose change or if pose change is less than or equal to a threshold, a UE may skip transmission of both a CG PUSCH for pose and UCI for piggyback. Here, a data unit for pose information without pose change (e.g., a TB including pose information) may also be discarded. For example, if there is no pose change or if pose change is less than or equal to a threshold, a packet data convergence protocol (PDCP) entity that provides a radio bearer for pose information may discard a data unit for pose information. As another example, if there is no pose change or if pose change is less than or equal to a threshold, a UE may be configured to discard a corresponding data unit by causing a PDCP entity to expire a PDCP discard timer for a data unit of pose information.

Alternatively, if there is no pose change or if pose change is less than or equal to a threshold, a UE may discard a TB including only such pose information.

Alternatively, if there is no pose change or if pose change is less than or equal to a threshold, a higher layer of a UE may discard this pose information or transmit it through a separate radio bearer and logical channel. Here, a PDCP entity for a separate radio bearer may be configured with a shorter PDCP discard timer than the PDCP entity.

As another example, a base station may configure/allocate a separate logical channel for transmitting pose information, and may configure to map/assign this to a specific PUCCH resource and a specific scheduling request (SR) configuration. And, when pose information for the logical channel is generated, the corresponding pose information triggers a buffer state request (BSR), and the BSR may be configured to trigger an SR. Here, for example, a BSR MAC CE may indicate that there is pose information to be transmitted by a UE through a value of a Logical Channel Group field or another specific field. Alternatively, when pose information for the logical channel is generated, an SR may be configured to trigger immediately without a BSR. When an SR for pose is triggered, a UE may transmit UCI with a PUCCH resource for this.

Here, if there is no pose change or if pose change is less than or equal to a threshold, it may be configured not to trigger a BSR or an SR. Alternatively, if there is no pose change or if pose change is less than or equal to a threshold, pose information may be discarded so as not to trigger a BSR or an SR.

To this end, for example, a base station may connect/associate pose information with a specific CG configuration index (e.g., CG-ConfigIndex) or connect/associate pose information with a specific SR configuration. A UE and a base station can connect/associate this specific CG or specific SR configuration with a specific SPS configuration. Therefore, after transmission of UCI for a specific CG associated with pose or a CG PUSCH for pose, or transmission of a specific SR PUCCH associated with pose, a UE and a base station can start an SPS window or an SPS mask immediately after (a specific time) or start an SPS window timer or an SPS mask timer.

Here, it may be determined whether an SPS window (or SPS window timer) starts or an SPS mask (or SPS mask timer) starts according to information or values (e.g., pose information) in UCI.

For example, if a value other than 1 or 00 is indicated as UCI or if the SR is transmitted, an SPS window may start or an SPS window timer may start immediately after (a specific time) from a pose information transmission time, a UCI transmission time, or an SR transmission time. Here, a UE may receive SPS PDSCH(s) during an SPS window or while an SPS window timer is running.

As another example, if 0 or 00 is indicated as UCI or the SR is transmitted, an SPS mask may start or an SPS mask timer may start immediately after (a specific time) from a pose information transmission time, a UCI transmission time, or an SR transmission time. Here, a UE may skip reception of SPS PDSCH(s) during an SPS mask or while an SPS mask timer is running.

The specific time may be configured/indicated by a base station to a UE through an RRC message, a MAC CE, or DCI. Alternatively, a UE may specify and include it in pose information and transmit it to a base station. For example, the specific time may be configured as a round trip time (RTT) timer.

Meanwhile, in the methods 1-1 to 1-4, an SPS window, an SPS mask, or an SPS skip duration may be configured/indicated by the number of SPS periods, the number of SPS PDSCH resource(s) (i.e., the number of TOs), or the number of slots with an SPS PDSCH resource. In addition, the SPS window or the SPS mask or the CG skip duration may be configured for one or a plurality of SPS configuration indices (eg, SPS-ConfigIndex).

In addition, in the methods 1-1 to 1-4, in an SPS mask or an SPS skip duration, a UE may skip monitoring for retransmission DCI (i.e., DCI for retransmission indication for an SPS PDSCH) of corresponding SPS in addition to receiving an SPS PDSCH. To this end, a search space for retransmission DCI may be separately designated/configured. For example, although retransmission DCI is monitored in a corresponding search space, retransmission DCI may not be monitored in an SPS mask or an skip duration even in the corresponding search space.

Figure 10:
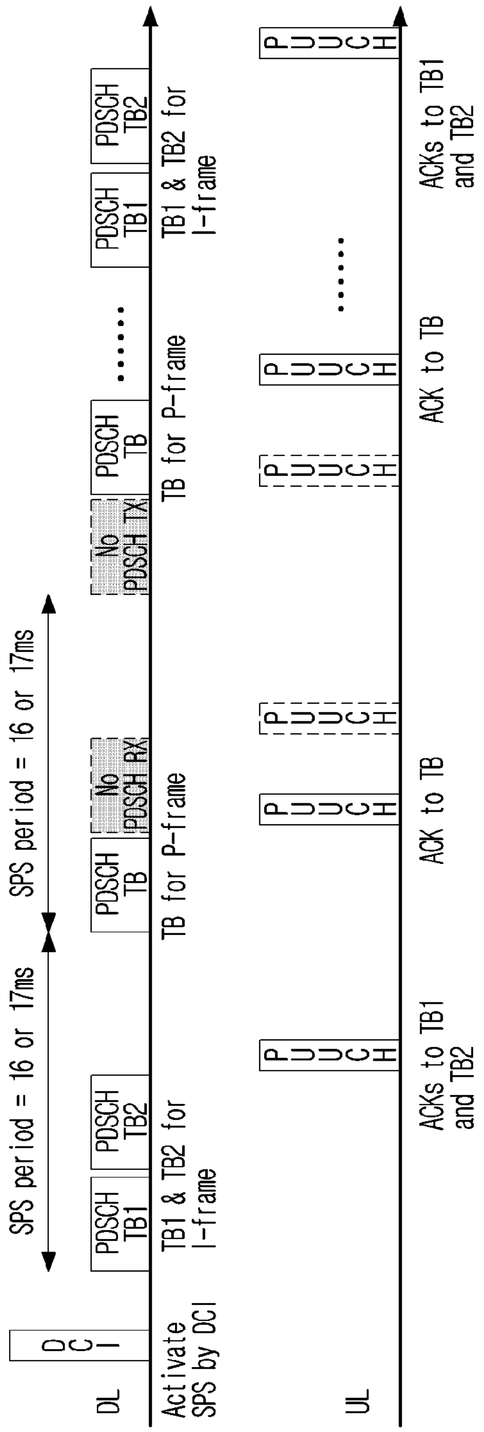
FIG. 10 illustrates a single semi-persistent scheduling configuration according to one embodiment of the present disclosure.

FIG. 10 illustrates a single semi-persistent scheduling configuration according to one embodiment of the present disclosure.

Hereinafter, an embodiment according to the present disclosure will be described with reference to FIG. 10.

Embodiment 2

When one SPS configuration is configured in a UE, an SPS PDSCH for the corresponding SPS configuration may be transmitted and received as follows.

Here, a logical channel mapped to one SPS configuration may be mapped only to specific SPS period(s). In addition, a UE may not receive some SPS PDSCH occasions (i.e., TO) in a specific SPS period according to a mapped logical channel.

According to this embodiment, a UE may receive an SPS PDSCH at N (N is a natural number) SPS PDSCH occasions (i.e., TO) in every SPS period. For example, for SPS PDSCHs belonging to (one or more) SPS periods or SPS windows for receiving data of a specific logical channel (hereinafter, a first logical channel) such as a logical channel of an I-frame, a UE may receive N (N is a natural number) SPS PDSCH occasions (i.e., TO) in every SPS period.

Here, a base station may allocate N SPS PDSCH occasions for each SPS period only within this (one or more) SPS periods or SPS windows. Alternatively, N SPS PDSCH occasions may always be allocated for every SPS period regardless of an SPS period or an SPS window.

For example, referring to FIG. 10, two SPS PDSCH occasions may be allocated to the first SPS period. A UE may determine that the first SPS period belonging to an SPS window of an I-frame logical channel is mapped only to an I-frame logical channel. Accordingly, a UE may receive both of the two SPS PDSCH occasions in the first SPS period. On the other hand, a UE may determine that the second and third SPS periods that do not belong to an SPS window of an I-frame logical channel (or belonging to an SPS window of a P-frame logical channel) are not mapped to an I-frame logical channel, or may be determined to be mapped to a P-frame logical channel. Therefore, a UE can receive only one SPS PDSCH occasion in the second and third SPS periods.

Here, when a TB is successfully received on an SPS PDSCH occasion received in a second or third SPS period (as in the example of the second SPS period of FIG. 10), a UE may skip without receiving next SPS PDSCH occasions of the same SPS period. However, if a TB is not successfully received on an SPS PDSCH occasion received in ae second or third SPS period, a UE may acquire a TB by receiving the next SPS PDSCH occasion.

In addition, a UE may transmit a HARQ-ACK for a TB received in a specific slot after a predetermined offset from an SPS PDSCH occasion at which the TB was received. Accordingly, a PUCCH slot for transmitting a HARQ-ACK may be allocated differently according to an SPS PDSCH occasion location at which a UE receives a TB. Alternatively, a UE may transmit a HARQ-ACK for a TB received in a specific slot after a predetermined offset based on the first or last SPS PDSCH occasion in a corresponding SPS period regardless of an SPS PDSCH occasion at which the TB was received.

Meanwhile, (i) for SPS PDSCHs that do not belong to (one or more) SPS periods or SPS windows for receiving data of a first logical channel, or (ii) for SPS PDSCHs belonging to an SPS period or SPS window for receiving data of another logical channel (i.e., a second logical channel), a UE can receive only k (K is a natural number) SPS PDSCH occasions in every SPS period. Here, a base station may configure k to a value smaller than N. In the case of (i), if (one or more) SPS periods or SPS windows for a first logical channel are configured, it may be unnecessary to configured (one or more) SPS periods or SPS windows for a second logical channel. On the other hand, in the case of (ii), even if (one or more) SPS periods or SPS windows for a first logical channel are configured, configuration of (one or more) SPS periods or SPS windows for a second logical channel may also be separately required.

Here, a base station may allocate k SPS PDSCH occasions (i.e., TOs) for each SPS period only within (one or more) SPS periods or SPS windows (i.e., in the case of (i), a period other than (one or more) SPS periods or SPS windows configured for a first logical channel, whereas in the case of (ii), (one or more) SPS periods or SPS windows configured for a second logical channel) related to a second logical channel. Alternatively, a base station allocates N SPS PDSCH occasions (i.e., TO) for every SPS period regardless of (one or more) SPS periods or SPS windows related to a second logical channel, however a UE may receive only an SPS PDSCH on specific k SPS PDSCH occasions in N SPS PDSCH occasions and may skip reception of an SPS PDSCH on the remaining N-k SPS PDSCH occasions. Here, the specific k SPS PDSCH occasions (i.e., TOs) may correspond to the first SPS PDSCH occasion of a corresponding SPS period to the k-th SPS PDSCH occasion, or may correspond to the (N−k+1)-th SPS PDSCH occasion of a corresponding SPS period to the last N-th SPS PDSCH occasion.

In this way, when a UE receives only specific k SPS PDSCHs in a corresponding SPS period, the UE may transmit a HARQ-ACK for the received TB in a specific slot after a predetermined offset from the k-th SPS PDSCH occasion. However, when a UE receives only N specific SPS PDSCHs in a corresponding SPS period, the UE may transmit a HARQ-ACK for the received TB in a specific slot after a predetermined offset from the N-th SPS PDSCH occasion. Accordingly, PUCCH slots in which the UE transmits a HARQ-ACK for each SPS period may be allocated differently.

Alternatively, regardless of how many SPS PDSCHs a UE has received (within one SPS) or how many SPS PDSCHs a base station has actually allocated, in every SPS period, a HARQ-ACK for the received TB may be transmitted in a specific slot after a predetermined offset from the N-th SPS PDSCH occasion.

Method 2-1: Both a first logical channel (e.g., a logical channel for an I-frame) and a second logical channel (e.g., a logical channel for a P-frame) may be mapped to a specific SPS configuration. And, a base station may configure a first logical channel (e.g., a logical channel for an I-frame) to be mapped only to an SPS period that is a multiple of N (i.e., 0-th CG period, N-th CG period, 2N-th CG period, etc.), and a second logical channel (e.g., a logical channel for a P-frame) to be mapped only to the remaining SPS periods (i.e., the 2nd to N−1-th CG periods, the (N+1)-th to (2N−1)-th CG periods, etc.). For example, when N is 10, a first logical channel (e.g., a logical channel for an I-frame) is configured to be mapped to SPS periods such as the 0th, 10th, 20th, 30th, . . . , and a second logical channel (e.g., a logical channel for a P-frame) may be configured to be mapped to the remaining CG periods. Here, for example, a base station can configure an SPS period of a specific SPS configuration to 16 ms or 17 ms.

According to method 5-1, only the N value for an SPS period to which a first logical channel is mapped may be configured by a base station, and accordingly, a first logical channel may be mapped to an SPS period in which N is a multiple. And, even without a separate configuration, a second logical channel may be mapped in the remaining SPS periods.

Referring to FIG. 10, in the first SPS period and the N-th SPS period, a logical channel for an I-frame may be mapped, and TB 1 and TB 2 for the I-frame may be transmitted. Also, in the remaining SPS periods, a logical channel for a P-frame may be mapped and TBs for the P-frame may be transmitted.

Method 5-2: Both a first logical channel (e.g., a logical channel for an I-frame) and a second logical channel (e.g., a logical channel for a P-frame) may be mapped to a specific SPS configuration. Here, when there is data for a first logical channel (e.g., a logical channel for an I-frame), a TB may be configured preferentially with only the first logical channel, and data of other second logical channel (e.g., a logical channel for a P-frame) may not be included in the corresponding TB. For example, when I-frame data is generated, a UE can configure a TB with only I-frame data and receive an SPS PDSCH even if there is P-frame data. Here, when a UE receives a TB for a first logical channel (e.g., a logical channel for an I-frame) in a specific SPS period, from the next SPS period of the same SPS configuration, it can be expected to receive a TB for a second logical channel (e.g., a logical channel for a P-frame).

According to method 5-2, priorities for a first logical channel and a second logical channel may be configured by a base station. In addition, reception of data for a logical channel with a low priority may be skipped or deferred depending on whether data for a logical channel with a high priority is generated by a UE.

Referring to FIG. 10, it can be interpreted as a case in which data for a logical channel mapped to an I-frame is generated in the first SPS period and the N-th SPS period. Accordingly, TB 1 and TB 2 for the I-frame may be transmitted. In addition, it may be interpreted as a case in which data for a logical channel mapped to an I-frame is not generated in the remaining SPS periods. Therefore, a TB for a P-frame can be transmitted.

Method 5-3: An SPS window may be configured for a specific SPS configuration. Regarding reception of an SPS PDSCH within the configured SPS window, the SPS PDSCH may be received only through a specific first logical channel (e.g., a logical channel for an I-frame). In addition, a base station and a UE can expect this type of operation.

Here, SPS windows may be separately configured for each logical channel, and different logical channels may be mapped only to different SPS windows.

Referring to FIG. 10, it can be interpreted as a case where an SPS window for an I-frame are configured for the first SPS period and the N-th SPS period, and an SPS window for a P-frame are configured for the remaining SPS periods. Therefore, only TB 1 and TB 2 of a logical channel for an I-frame can be transmitted in the first SPS period and the N-th SPS period, and only TB of a logical channel for a P-frame can be transmitted in the remaining SPS periods.

Embodiment 3

DRX-Based SPS PDSCH Reception Method

A UE can receive only an SPS PDSCH including a DL slot corresponding to a DRX active time.

In the present disclosure, a DRX active time (or DRX active (state)) may mean a DRX active time (or DRX active (state) of a base station or UE. For example, a DRX active time may be a cell DRX active time of a base station or a UE specific DRX active time.

In other words, an SPS window in Embodiment 1 may be included in a DRX active time of a UE or correspond to one example. In addition, an SPS mask may be included in a DRX non-active time of a UE or correspond to one example.

Here, a separate on-duration timer for an active time for SPS PDSCH reception may be periodically configured. Alternatively, an SPS PDSCH can be received only in the existing DRX active time duration (see the DRX operation described above and FIG. 7). The above-mentioned DRX active time or a separate on-duration is mapped only to one or more specific SPS-ConfigIndex(s), or only to one or more specific serving cells where SPS is configured, or all SPS configurations (i.e., all SPS configurations configured in a UE).

For example, if a DRX active time or a separate on-duration is included in a specific SPS PDSCH occasion, or conversely, if a specific SPS PDSCH occasion is included in a DRX active time or a separate on-duration, a UE may receive the corresponding SPS PDSCH. Otherwise, a UE may skip without receiving the corresponding SPS PDSCH.

Here, when a UE receives an SPS PDSCH at a specific SPS PDSCH occasion, the UE may start or restart a DRX inactivity timer. In addition, a UE may receive an SPS PDSCH at an additional SPS PDSCH occasion while the DRX inactivity timer is running. Then, when the inactivity timer expires, a short or long DRX cycle may begin.

The first SPS PDSCH occasion of every SPS period may be defined/configured to be included in a DRX active time. Therefore, a UE can always receive an SPS PDSCH at the first SPS PDSCH occasion of every SPS period. Thereafter, a UE may start or restart a DRX inactivity timer to receive an SPS PDSCH at the next SPS PDSCH occasion(s) of the same SPS period.

A base station may allocate an A/N PUCCH resource for each SPS-ConfigIndex for an SPS PDSCH. Here, a UE may transmit an A/N PUCCH to a base station only at a DRX active time, or a UE may transmit an A/N PUCCH to a base station only at a separate UL active time aligned with a DRX active time. For example, a UL active time may be configured earlier or later by an offset relative to an DRX active time.

Here, if an A/N PUCCH is not included in a DRX active time or a UL active time and HARQ-ACKs for one or more SPS PDSCHs cannot be transmitted, a UE may defer HARQ-ACK information for the corresponding SPS PDSCH until an A/N PUCCH resource available later. HARQ-ACK information for one or multiple SPS PDSCHs to be deferred is multiplexed (with other HARQ-ACK information to be transmitted in the next available PUCCH resource) belonging to a DRX active time or a UL active time and can be transmitted.

Figure 11:
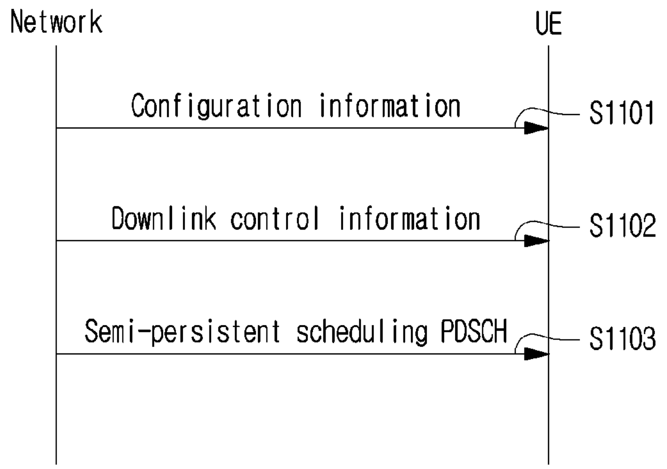
FIG. 11 illustrates a signaling procedure between a network and a UE for a method for transmitting and receiving a semi-persistent scheduling PDSCH according to an embodiment of the present disclosure.

FIG. 11 illustrates a signaling procedure between a network and a UE for a method for transmitting and receiving a semi-persistent scheduling PDSCH according to an embodiment of the present disclosure.

FIG. 11 illustrates signaling between a network (e.g., TRP 1 and TRP 2) and a UE for the methods (e.g., Embodiments 1 to 3 and a combination of one or more proposed methods in Embodiments 1 to 3) proposed in the present disclosure. FIG. 11 is only for convenience of description and does not limit the scope of the present disclosure. In addition, some step(s) illustrated in FIG. 11 may be omitted depending on circumstances and/or settings.

The signaling scheme described in FIG. 11 may be extended and applied to signaling between multiple TRPs and multiple UEs. In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

A base station may mean a generic term for an object that transmits and receives data to and from a UE. For example, a base station may be a concept including one or more transmission points (TPs), one or more transmission and reception points (TRPs), etc. Also, a TP and/or a TRP may include a panel of a base station, a transmission and reception unit, etc. In addition, "TRP" may be substituted with an expression such as a panel, an antenna array, a cell (e.g., macro cell/small cell/pico cell, etc.), TP (transmission point), a base station (base station, gNB, etc.), etc. and applied. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

A UE may receive configuration information from a network (S1101).

The configuration information may be transmitted through higher layer signaling (e.g., RRC signaling, MAC-CE, etc.).

The configuration information may include configuration information related to an SPS configuration described in the above-described proposed methods (e.g., Embodiments 1 to 3 and a combination of one or more proposed methods in Embodiments 1 to 3). For example, one or more SPS configurations may be configured for a UE, and the configuration information may include respective configuration information (e.g., SPS-Config IE) for each of one or more SPS configurations. Here, the respective configuration information for each of the one or more SPS configurations may include information/parameters exemplified in Table 6 above.

In addition, for example, respective configuration information for each SPS configuration according to the above-described Embodiment may include information on a logical channel associated with the corresponding SPS configuration.

A UE may receive downlink control information from a network (S1102).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a UE may receive respective activation DCI for one or more SPS configurations from a network.

In addition, although not shown in FIG. 11, a UE may receive information on a specific period (e.g., a non-active period) from a network. Here, information on a specific interval may be transmitted through the activation DCI or second DCI different from the DCI, a MAC CE, or an RRC information element/parameter (e.g., the configuration information).

For example, the information on the specific interval may include a start time and a duration of the specific interval. Here, the start time and the duration may be indicated in units of SPS PDSCH resources (or TOs) or slots.

In addition, the specific interval may be configured periodically or non-periodically. Here, when the specific interval is configured periodically, the information on the specific interval may further include period information.

The information on the specific interval can be valid/applied only in a predetermined time duration. For example, it can be valid/applied only for a predetermined time duration immediately after information on the specific interval is received or immediately after an acknowledgment (ACK) related to the information on the specific interval is transmitted.

In addition, the specific interval may configured/indicated not to be included in a DRX active time according to the Embodiment 3 (e.g., a cell DRX active time of a base station or a UE specific DRX active time) in time)).

A UE receives an SPS PDSCH from a network (S1103).

Here, a UE may receive an SPS PDSCH from a network based on the operation described in the above-described proposed method (e.g., Embodiments 1 to 3 and a combination of one or more proposed methods in Embodiments 1 to 3).

Here, for example, according to the Embodiment 1, based on the information on the specific interval, an SPS PDSCH may not be transmitted in SPS PDSCH resources (or TOs) for the one or more SPS configurations included in the specific interval (e.g., non-active period). In addition, an SPS PDSCH may be transmitted in SPS PDSCH resources (or TOs) for the one or more SPS configurations not included in the specific interval.

Here, as described above, the information on the specific interval can be valid/applied only to a predetermined time duration. For example, it can be valid/applied only for a predetermined time duration immediately after information on the specific interval is received or immediately after an acknowledgment (ACK) related to the information on the specific interval is transmitted. That is, an SPS PDSCH may not be transmitted in SPS PDSCH resources (or TOs) for the one or more SPS configurations in the specific interval only in time where the information on the specific interval is valid/applied. In addition, transmission of an SPS PDSCH in SPS PDSCH resources (or TOs) for the one or more SPS configurations may be performed regardless of the control information in time where the information on the specific interval is not valid/applicable.

In addition, for example, according to the Embodiment 2, only a specific logical channel can be mapped to a specific (one or more) period in one SPS configuration, a TB transmitted in an SPS PDSCH may be determined according to a logical channel mapped according to (one or more) SPS periods. Alternatively, when a plurality of logical channels are mapped in one SPS configuration, a TB transmitted in an SPS PDSCH may be determined according to a priority of logical channels. Alternatively, only a specific logical channel may be mapped within a specific SPS window within one SPS configuration, and only an SPS PDSCH for the corresponding logical channel may be transmitted.

In addition, for example, according to the Embodiment 3, the SPS PDSCH may be transmitted only in SPS PDSCH resources for one or more SPS configurations included in a DRX active time (e.g., a cell DRX active time of a base station or a UE specific DRX active time). On the other hand, transmission of the SPS PDSCH may not be performed in SPS PDSCH resources for the one or more SPS configurations not included in the DRX active time. Here, also, the first SPS PDSCH resource of every SPS period for the one or more SPS configurations may always be included in the DRX active time.

Here, as described above, the specific interval may not be included in a DRX active time (e.g., a cell DRX active time of a base station or a UE specific DRX active time). That is, in this case, the specific interval can be configured/indicated by the control information so that transmission/reception of the SPS PDSCH can be guaranteed in a DRX active time.

In addition, a PUCCH resource for HARQ-ACK information may be allocated for each of the one or more SPS configurations, and a UE may transmit the HARQ-ACK information to a network only on a PUCCH resource included in the DRX active time. Here, HARQ-ACK information for a PUCCH resource not included in the DRX active time may be multiplexed and transmitted on the next available PUCCH resource.

Figure 12:
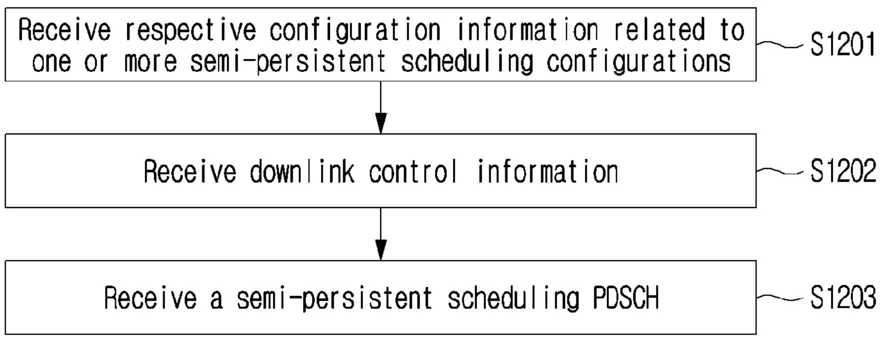
FIG. 12 is a diagram illustrating an operation of a UE for a method for transmitting and receiving a semi-persistent scheduling PDSCH according to an embodiment of the present disclosure.

FIG. 12 is a diagram illustrating an operation of a UE for a method for transmitting and receiving a semi-persistent scheduling PDSCH according to an embodiment of the present disclosure.

Referring to FIG. 12, FIG. 12 exemplifies an operation of a UE based on the proposed methods (e.g., Embodiments 1 to 3 and a combination of one or more proposed methods in Embodiments 1 to 3). FIG. 12 is only for convenience of description, but it is not intended to limit a scope of the present disclosure. Some step(s) shown in FIG. 12 may be omitted according to situations and/or configurations, etc. In addition, a UE in FIG. 12 is only one example, and may be implemented as an apparatus illustrated in FIG. 14. For example, a processor (102/202) of FIG. 14 may control to transmit and receive channel/signal/data/information, etc. by using a transceiver (106/206), and control to store transmitted or received channel/signal/data/information in a memory (104/204).

Figure 14:
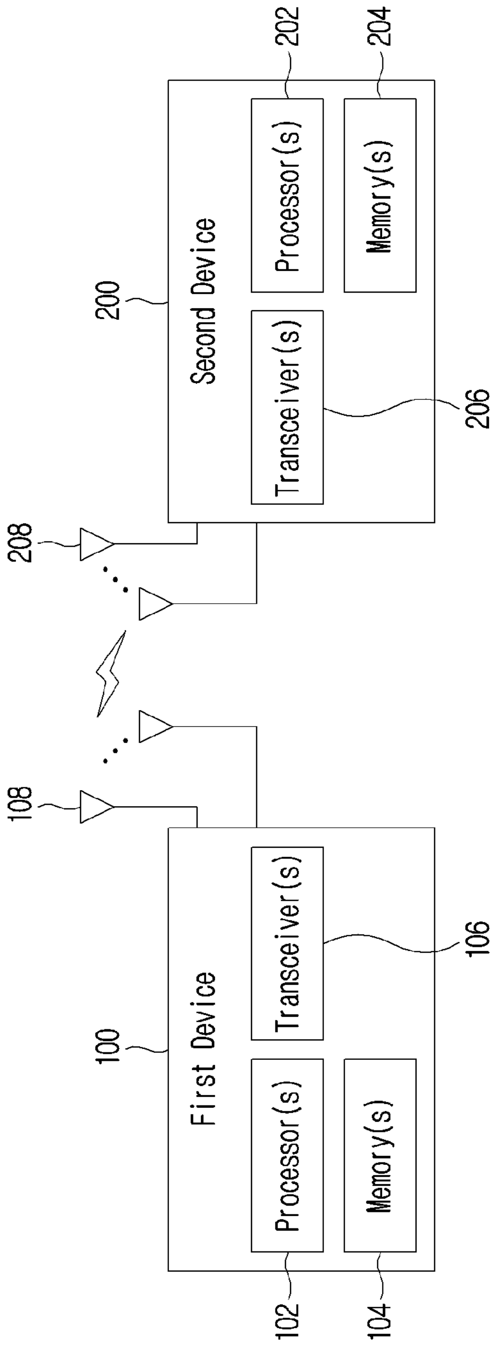
FIG. 14 illustrates a block diagram of a wireless communication device according to an embodiment of the present disclosure.

In addition, an operation of FIG. 12 may be processed by one or more processors (102, 202) of FIG. 14. In addition, an operation of FIG. 12 may be stored in a memory (e.g., one or more memories (104, 204) of FIG. 14) in a form of an instruction/program (e.g., instruction, executable code) for driving at least one processor (e.g., 102, 202) of FIG. 14.

A UE receives respective configuration information related to one or more semi-persistent scheduling (SPS) configurations from a base station (S1201).

The configuration information related the SPS configuration may include configuration information related to an SPS configuration described in the above-described proposed methods (e.g., Embodiments 1 to 3 and a combination of one or more proposed methods in Embodiments 1 to 3). For example, one or more SPS configurations may be configured for a UE, and respective configuration information (e.g., SPS-Config IE) for each of one or more SPS configurations may include information/parameters exemplified in Table 6 above.

In addition, for example, respective configuration information for each SPS configuration according to the above-described Embodiment may include information on a logical channel associated with the corresponding SPS configuration.

A UE receives downlink control information from a base station (S1202).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a UE may receive respective activation DCI for one or more SPS configurations from a base station.

In addition, although not shown in FIG. 12, a UE may receive information on a specific period (e.g., a non-active period) from a base station. Here, information on a specific interval may be transmitted through the activation DCI or second DCI different from the DCI, a MAC CE, or an RRC information element/parameter (e.g., the configuration information).

For example, the information on the specific interval may include a start time and a duration of the specific interval. Here, the start time and the duration may be indicated in units of SPS PDSCH resources (or TOs) or slots.

In addition, the specific interval may be configured periodically or non-periodically. Here, when the specific interval is configured periodically, the information on the specific interval may further include period information.

The information on the specific interval can be valid/applied only in a predetermined time duration. For example, it can be valid/applied only for a predetermined time duration immediately after information on the specific interval is received or immediately after an acknowledgment (ACK) related to the information on the specific interval is transmitted.

In addition, the specific interval may configured/indicated not to be included in a DRX active time according to the Embodiment 3 (e.g., a cell DRX active time of a base station or a UE specific DRX active time) in time)).

A UE receives an SPS PDSCH from a base station (S1203).

Here, based on the information on the specific interval, a UE may not receive an SPS PDSCH in SPS PDSCH resources (or TOs) for the one or more SPS configurations included in the specific interval (e.g., non-active period). In addition, a UE may receive an SPS PDSCH in SPS PDSCH resources (or TOs) for the one or more SPS configurations not included in the specific interval.

Here, as described above, the information on the specific interval can be valid/applied only to a predetermined time duration. For example, it can be valid/applied only for a predetermined time duration immediately after information on the specific interval is received or immediately after an acknowledgment (ACK) related to the information on the specific interval is transmitted. That is, a UE may not receive an SPS PDSCH in SPS PDSCH resources (or TOs) for the one or more SPS configurations in the specific interval only in time where the information on the specific interval is valid/applied. In addition, reception of an SPS PDSCH in SPS PDSCH resources (or TOs) for the one or more SPS configurations may be performed regardless of the control information in time where the information on the specific interval is not valid/applicable.

In addition, a UE may receive the SPS PDSCH only in SPS PDSCH resources for one or more SPS configurations included in a DRX active time (e.g., a cell DRX active time of a base station or a UE specific DRX active time). On the other hand, a UE may not receive transmission of the SPS PDSCH in SPS PDSCH resources for the one or more SPS configurations not included in the DRX active time. Here, also, the first SPS PDSCH resource of every SPS period for the one or more SPS configurations may always be included in the DRX active time.

Here, as described above, the specific interval may not be included in a DRX active time (e.g., a cell DRX active time of a base station or a UE specific DRX active time). That is, in this case, the specific interval can be configured/indicated by the control information so that transmission/reception of the SPS PDSCH can be guaranteed in a DRX active time.

In addition, a PUCCH resource for HARQ-ACK information may be allocated for each of the one or more SPS configurations, and a UE may transmit the HARQ-ACK information to a base station only on a PUCCH resource included in the DRX active time. Here, HARQ-ACK information for a PUCCH resource not included in the DRX active time may be multiplexed and transmitted on the next available PUCCH resource.

Figure 13:
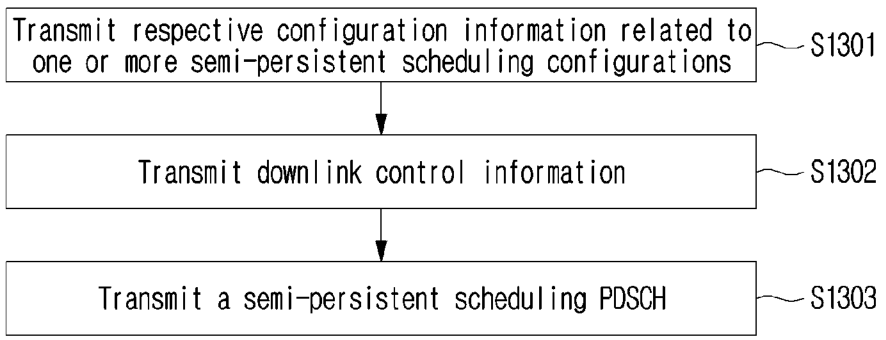
FIG. 13 is a diagram illustrating an operation of a base station for a method for transmitting and receiving a semi-persistent scheduling PDSCH according to an embodiment of the present disclosure.

FIG. 13 is a diagram illustrating an operation of a base station for a method for transmitting and receiving a semi-persistent scheduling PDSCH according to an embodiment of the present disclosure.

Referring to FIG. 13, FIG. 13 exemplifies an operation of a base station based on the proposed methods (e.g., Embodiments 1 to 3 and a combination of one or more proposed methods in Embodiments 1 to 3). FIG. 13 is only for convenience of description, but it is not intended to limit a scope of the present disclosure. Some step(s) shown in FIG. 13 may be omitted according to situations and/or configurations, etc. In addition, a base station in FIG. 13 is only one example, and may be implemented as an apparatus illustrated in FIG. 14. For example, a processor (102/202) of FIG. 14 may control to transmit and receive channel/signal/data/information, etc. by using a transceiver (106/206), and control to store transmitted or received channel/signal/data/information in a memory (104/204).

In addition, an operation of FIG. 13 may be processed by one or more processors (102, 202) of FIG. 14. In addition, an operation of FIG. 13 may be stored in a memory (e.g., one or more memories (104, 204) of FIG. 14) in a form of an instruction/program (e.g., instruction, executable code) for driving at least one processor (e.g., 102, 202) of FIG. 14.

A base station transmits respective configuration information related to one or more semi-persistent scheduling (SPS) configurations to a UE (S1301).

The configuration information related the SPS configuration may include configuration information related to an SPS configuration described in the above-described proposed methods (e.g., Embodiments 1 to 3 and a combination of one or more proposed methods in Embodiments 1 to 3). For example, one or more SPS configurations may be configured for a UE, and respective configuration information (e.g., SPS-Config IE) for each of one or more SPS configurations may include information/parameters exemplified in Table 6 above.

In addition, for example, respective configuration information for each SPS configuration according to the above-described Embodiment may include information on a logical channel associated with the corresponding SPS configuration.

A base station transmits downlink control information to a UE (S1302).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a base station may transmit respective activation DCI for one or more SPS configurations to a UE.

In addition, although not shown in FIG. 13, a base station may transmit information on a specific period (e.g., a non-active period) to a UE. Here, information on a specific interval may be transmitted through the activation DCI or second DCI different from the DCI, a MAC CE, or an RRC information element/parameter (e.g., the configuration information).

For example, the information on the specific interval may include a start time and a duration of the specific interval. Here, the start time and the duration may be indicated in units of SPS PDSCH resources (or TOs) or slots.

In addition, the specific interval may be configured periodically or non-periodically. Here, when the specific interval is configured periodically, the information on the specific interval may further include period information.

The information on the specific interval can be valid/applied only in a predetermined time duration. For example, it can be valid/applied only for a predetermined time duration immediately after information on the specific interval is transmitted or immediately after an acknowledgment (ACK) related to the information on the specific interval is received.

In addition, the specific interval may configured/indicated not to be included in a DRX active time according to the Embodiment 3 (e.g., a cell DRX active time of a base station or a UE specific DRX active time) in time)).

A base station transmits an SPS PDSCH to a UE (S1303).

Here, a UE may receive an SPS PDSCH from a base station based on the operation described in the above-described proposed method (e.g., Embodiments 1 to 3 and a combination of one or more proposed methods in Embodiments 1 to 3).

Here, based on the information on the specific interval, a base station may not transmit an SPS PDSCH to a UE in SPS PDSCH resources (or TOs) for the one or more SPS configurations included in the specific interval (e.g., non-active period). In addition, a base station may transmit an SPS PDSCH to a UE in SPS PDSCH resources (or TOs) for the one or more SPS configurations not included in the specific interval.

Here, as described above, the information on the specific interval can be valid/applied only to a predetermined time duration. For example, it can be valid/applied only for a predetermined time duration immediately after information on the specific interval is transmitted or immediately after an acknowledgment (ACK) related to the information on the specific interval is received. That is, a base station may not transmit an SPS PDSCH to a UE in SPS PDSCH resources (or TOs) for the one or more SPS configurations in the specific interval only in time where the information on the specific interval is valid/applied. In addition, reception of an SPS PDSCH in SPS PDSCH resources (or TOs) for the one or more SPS configurations may be performed regardless of the control information in time where the information on the specific interval is not valid/applicable.

In addition, a base station may transmit the SPS PDSCH to a UE only in SPS PDSCH resources for one or more SPS configurations included in a DRX active time (e.g., a cell DRX active time of a base station or a UE specific DRX active time). On the other hand, a base station may not transmit the SPS PDSCH to a UE in SPS PDSCH resources for the one or more SPS configurations not included in the DRX active time. Here, also, the first SPS PDSCH resource of every SPS period for the one or more SPS configurations may always be included in the DRX active time.

Here, as described above, the specific interval may not be included in a DRX active time (e.g., a cell DRX active time of a base station or a UE specific DRX active time). That is, in this case, the specific interval can be configured/indicated by the control information so that transmission/reception of the SPS PDSCH can be guaranteed in a DRX active time.

In addition, a PUCCH resource for HARQ-ACK information may be allocated for each of the one or more SPS configurations, and the HARQ-ACK information may be receive only on a PUCCH resource included in the DRX active time. Here, HARQ-ACK information for a PUCCH resource not included in the DRX active time may be multiplexed and received on the next available PUCCH resource.

General Device to which the Present Disclosure May be Applied

FIG. 14 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE), from a base station, first configuration information related to semi-persistent scheduling (SPS) configuration and second configuration information for configuring a specific duration, wherein the specific duration is configured per serving cell, and the second configuration information includes information for a start time of the specific duration;

receiving, by the UE, from the base station, downlink control information including an indication related to the specific duration; and based on i) the specific duration being configured and ii) the indication being received, receiving, by the UE, from the base station, an SPS physical downlink shared channel (PDSCH) during the specific duration and skipping reception of the SPS PDSCH outside the specific duration.

2. The method of claim 1, wherein the specific duration is configured periodically.

3. The method of claim 1, wherein the second configuration information is transmitted via radio resource control (RRC) signaling.

4. The method of claim 3, wherein the second configuration information is valid only for a predetermined time duration immediately after the second configuration information is received or immediately after hybrid automatic repeat request (HARQ) acknowledgment (ACK) information on the specific duration is transmitted.

5. The method of claim 1, wherein the specific duration is not included in discontinuous reception (DRX) active time of the UE.

6. The method of claim 5, wherein the SPS PDSCH is received only from an SPS PDSCH resource for the SPS configuration included in the DRX active time.

7. The method of claim 6, wherein a first SPS PDSCH resource of every SPS period for the SPS configuration is always included in the DRX active time.

8. The method of claim 6, wherein a physical uplink control channel (PUCCH) resource for hybrid automatic repeat request (HARQ)-acknowledgement (ACK) information is allocated for each of the SPS configurations, and wherein the HARQ-ACK information is transmitted only in a PUCCH resource included in the DRX active time.

9. The method of claim 8, wherein HARQ-ACK information for a PUCCH resource not included in the DRX active time is multiplexed and transmitted in a next available PUCCH resource.

10. A user equipment (UE) comprising:

at least one transceiver for transmitting and receiving a wireless signal; and at least one processor for controlling the at least one transceiver, wherein the at least one processor is configured to:

receive, from a base station, first configuration information related to semi-persistent scheduling (SPS) configuration and second configuration information for configuring a specific duration, wherein the specific duration is configured per serving cell, and the second configuration information includes information for a start time of the specific duration;

receive, from the base station, downlink control information including an indication related to the specific duration; and based on i) the specific duration being configured and ii) the indication being received, receive, from the base station, an SPS physical downlink shared channel (PDSCH) during the specific duration and skip reception of the SPS PDSCH outside the specific duration.

11. A base station comprising:

at least one transceiver for transmitting and receiving a wireless signal; and at least one processor for controlling the at least one transceiver, wherein the at least one processor is configured to:

transmit, to a user equipment (UE), first configuration information related to semi-persistent scheduling (SPS) configuration and second configuration information for configuring a specific duration, wherein the specific duration is configured per serving cell, and the second configuration information includes information for a start time of the specific duration;

transmit, to the UE, downlink control information including an indication related to the specific duration; and based on i) the specific duration being configured and ii) the indication being received, transmit, to the UE, an SPS physical downlink shared channel (PDSCH) only during the specific duration.

* * * * *